US010458214B2

(12) United States Patent
Liu et al.

(10) Patent No.: US 10,458,214 B2
(45) Date of Patent: Oct. 29, 2019

(54) OIL PUMPING APPARATUS WITHOUT A SPEED REDUCER

(71) Applicants: Yanan Liu, Dongying, Shandong Province (CN); Dawei Wang, Dongying, Shandong Province (CN)

(72) Inventors: Yanan Liu, Dongying, Shandong Province (CN); Dawei Wang, Dongying, Shandong Province (CN)

( * ) Notice: Subject to any disclaimer, the term of this patent is extended or adjusted under 35 U.S.C. 154(b) by 0 days.

(21) Appl. No.: 16/114,017

(22) Filed: Aug. 27, 2018

(65) Prior Publication Data
US 2019/0242223 A1 Aug. 8, 2019

(30) Foreign Application Priority Data
Feb. 2, 2018 (CN) .......................... 2018 1 0104414

(51) Int. Cl.
*E21B 43/12* (2006.01)
*G05B 19/05* (2006.01)
*F04B 47/02* (2006.01)

(52) U.S. Cl.
CPC .......... *E21B 43/127* (2013.01); *F04B 47/022* (2013.01); *G05B 19/05* (2013.01); *E21B 2043/125* (2013.01)

(58) Field of Classification Search
CPC ...... E21B 43/121; F04B 47/02; F04B 47/026; F04B 47/14; F04B 17/03
See application file for complete search history.

(56) References Cited

U.S. PATENT DOCUMENTS

| 2,237,430 A | * | 4/1941 | Higgins | .................. F04B 1/124 |
| | | | | 91/503 |
| 2,391,105 A | * | 12/1945 | Reed | ...................... F04B 19/16 |
| | | | | 198/523 |
| 3,968,041 A | * | 7/1976 | De Voss | ................. B65G 51/01 |
| | | | | 210/242.3 |
| 6,325,142 B1 | * | 12/2001 | Bosley | ............... E21B 47/0008 |
| | | | | 166/53 |
| 9,938,804 B2 | * | 4/2018 | Haarstad | .............. E21B 43/127 |

* cited by examiner

*Primary Examiner* — Thai T Dinh
(74) *Attorney, Agent, or Firm* — Dragon Sun Law Firm, PC; Jinggao Li, Esq.

(57) ABSTRACT

There is provided an oil pumping apparatus including: (1) a connector connected to a device; (2) a top platform; (3) a roller disposed on a top platform; (4) a motor disposed on the top platform; (5) a driven belt to enable synchronous drives to operate the roller; (6) a load belt moveable over the roller, one end of the load belt being connected to the connector, and the other end of the load belt being connected to a balance box to balance the weight of the device; and (7) a control system for the apparatus. When the motor rotates in a clockwise direction, the motor drives the roller rotate in the clockwise direction and the device moves down vertically; and when the motor rotates in an anticlockwise direction, the motor drives the roller rotate in the anticlockwise direction and the device moves up vertically.

20 Claims, 19 Drawing Sheets

OIL PUMPING APPARATUS WITHOUT A SPEED REDUCER

CROSS-REFERENCE TO RELATED PATENT APPLICATION

This application claims priority to and the benefit of Chinese Patent Application Serial No. 201810104414.7, filed Feb. 2, 2018, which is incorporated herein by reference in its entirety.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference is individually incorporated by reference.

BACKGROUND OF THE DISCLOSURE

1. Field of the Disclosure

The present disclosure relates generally to an oil pumping apparatus. More particularly, the present disclosure relates to an oil pumping apparatus without a speed reducer.

2. Description of Related Art

The background description provided herein is for the purpose of generally presenting the context of the present disclosure. The subject matter discussed in the background of the disclosure section should not be assumed to be prior art merely as a result of its mention in the background of the disclosure section. Similarly, a problem mentioned in the background of the disclosure section or associated with the subject matter of the background of the disclosure section should not be assumed to have been previously recognized in the prior art. The subject matter in the background of the disclosure section merely represents different approaches, which in and of themselves may also be disclosures. Work of the presently named inventors, to the extent it is described in the background of the disclosure section, as well as aspects of the description that may not otherwise qualify as prior art at the time of filing, are neither expressly nor impliedly admitted as prior art against the present disclosure.

In an oilfield industry, an oil pumping apparatus is mainly powered by electric motors. After being decelerated by a mechanical speed reducer, the oil pumping apparatus with complex mechanical transmission mechanism can pump the oil from an oilfield deep well through vertical reciprocating movements to achieve oil lifting.

Usually, the oil pumping apparatus has a walking beam, even though a vertical pumping apparatus without the walking beam is in the scale of use. With the increase of oil wells with water, thick oil wells, deep wells, wells to exact liquid for gas, and low-permeability wells, there is an urgent need for a long-stroke vertical pumping apparatus without the walking beam and with a large lifting power. Most of the vertical pumping units without the walking beams currently in use have complex structures and poor reliability. Further, the reversing mechanism and the mechanical gear reduction mechanism including mechanical commutation and electrical commutation caused that the oil pumping apparatus could not last long. Specifically, the wear, oil leakage, and oil seepage led to a large amount of maintenance work, low work efficiency, and short service life for the oil pumping apparatus.

There is an oil pumping apparatus with an electric—commutated permanent—magnet synchronous high-torque motor instead of a pumping unit with a speed reducer. Even though its structure of this kind of oil pumping apparatus is simple and may have no oil leakage problem, the cost is too high, which greatly hinders the application for the production in the oilfield industry.

In order to meet the need for long-stroke oilfield production, simple structure, high reliability, long life, low investment and maintenance costs of beamless pumping unit, there is a need to have an oil pumping apparatus without a speed reducer.

SUMMARY OF THE DISCLOSURE

The present disclosure provides an apparatus to pump crude oil from an oil well. The oil pumping apparatus includes (1) a connector connected to a device; (2) a top platform supported on a frame for operation and maintenance of the oil pumping apparatus; (3) a roller disposed on the top platform and having a first axle and being rotatable about the first axle and being connected to a first wheel coaxially, wherein the first wheel has a first diameter; (4) a motor disposed on the top platform and having a second axle, the motor being rotatable about the second axle and having a second wheel, wherein the second wheel has a second diameter, and the first diameter of the first wheel is at least five times of the diameter of the second wheel; (5) a driven belt covering the first wheel and the second wheel and being a heavy-duty timing belt to enable synchronous drives to operate the roller, wherein the roller is driven by the motor through the driven belt and the first wheel; (6) a load belt moveable over the roller, one end of the load belt being connected to the connector, and the other end of the load belt being connected to a balance box to balance the weight of the device; and (7) a control system for the apparatus, wherein when the motor rotates in a clockwise direction, the motor drives the roller rotate in the clockwise direction through the driven belt and the device moves down vertically; and wherein when the motor rotates in an anti-clockwise direction, the motor drives the roller rotate in the anticlockwise direction and the device moves up vertically.

In one embodiment, the motor is one selected from the group consisting of an asynchronous motor, a direct current motor, a switched reluctance motor and a permanent magnet synchronous motor.

In one embodiment, the motor has a torque capacity not lower than 700 N.m and a power not lower than 14 kilowatts.

In one embodiment, the driven belt includes a hybrid tension member made of a glass carbon compound that enables drive solutions and is usable in drives subject to heavy-duty tensile loads, acceleration forces and shock loads.

In one embodiment, the oil pumping apparatus further includes an intermediate shaft disposed between the motor and the roller. The immediate shaft has a first end connected to a third wheel and a second end connected to a fourth wheel, the third wheel is connected to the second wheel through a second driven belt and the fourth wheel is connected to the first wheel through a third driven belt, the second wheel of the motor drives the third wheel through the second driven belt and the fourth wheel through the immediate shaft simultaneously, and the fourth wheel drives the first wheel through the third driven belt.

In one embodiment, the third wheel has a third diameter and the fourth wheel has a fourth diameter, and each of the third diameter and the fourth diameter is larger than the second diameter and smaller than the first diameter.

In one embodiment, the load belt and balance box are moveable vertically.

In one embodiment, the oil pumping apparatus further includes an unloading mechanism of the device having an unloading wire rope. One end of the unloading wire rope is fixed with the roller, and the other end of the unloading wire rope goes through two movable pulleys of the balance box and connects to the top platform, and to unload the device from the connector, the roller collects the uploading wire rope to pull up the balance box vertically.

In one embodiment, the oil pumping apparatus further includes a loss-of-load protection mechanism. The loss-of-load protection mechanism includes (1) a speed limiter mounted on the top platform; (2) a fixed pulley mounted on the bottom of the frame; (3) a loss-of-load protection wire rope bypassing both the speed limiter and the fixed pulley; (4) a connecting rod assembly mounted on the top of the balance box; (5) two guide rails welded to the frame; and (6) two clamp assemblies each installed on one side of the balance box and each having wedge clamping pieces distributed on sides of the two guide rails, wherein one end of the loss-of-load protection wire rope is connected to the connecting rod assembly and the other end of the loss-of-load protection wire rope is connected to the balance box; and wherein when the weight of the device is disconnected from the oil pumping apparatus, the speed limiter holds the loss-of-load protection wire rope, and the loss-of-load protection wire rope grabs the connecting rod assembly to trigger that the wedge clamping pieces clamp one of the two guide rails and two clamp assemblies clamp the guide rails to prevent the balance box from falling.

In one embodiment, the oil pumping apparatus further includes guide wheels, wherein the two guide rails guide the movement of the balance box vertically through the guide wheels and each of the two guide rails is disposed between two guide wheels of the guide wheels.

In one embodiment, the oil pumping apparatus further includes: an encoder mounted on the motor, wherein the encoder sends a signal to a programmable logic controller to record the rotation of the motor.

In one embodiment, the oil pumping apparatus further includes a reference soft iron and a reference position switch, the reference soft iron being installed inside the load belt, wherein when the reference soft iron is in a closest position to the reference position switch, the reference position switch sets the closest position as a reference position and sends a signal to a programmable logic controller.

In one embodiment, the oil pumping apparatus includes an automatic mode and a manual operation mode.

In one embodiment, the control system further includes: (1) a programmable logic controller (PLC), (2) a motor controller connected to both the PLC and the motor, and (3) a text display directly connected to the PLC providing a frequency of the motor, a rotation speed of the motor, and an upper and a lower thresholds of movement distances of the load belt to the PLC.

In one embodiment, the PLC controls the motor controller and provides power to a relay coil for brake and a normal open relay switch.

In one embodiment, the control system further includes a power-off brake, wherein the relay coil for brake and the normal open relay switch control the operation of the power-off brake, and the power-off brake can set the oil pumping apparatus to have either a braking or a non-braking status.

In one embodiment, the motor controller controls start, stop, rotation speeds, and rotation directions of the motor, and provides real-time status of the motor to the PLC.

In one embodiment, the oil pumping apparatus further includes a display panel. The display panel includes an upwards start button, a downwards start button, and a stop button, wherein the upwards start button moves the connector up, the downwards start button moves the connector down, and the stop button stops the oil pumping apparatus.

In one embodiment, the motor controller determines the statuses of the motor on whether the motor is overloaded or has overcurrent and/or overvoltage.

In another embodiment, the friction coefficient between the load roller and the load belt is above 0.6 and the friction force is greater than the load difference between the device and the balance box so that there is no slip between the load roller and the load belt.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment.

DETAILED DESCRIPTION OF THE DISCLOSURE

Figure 1:
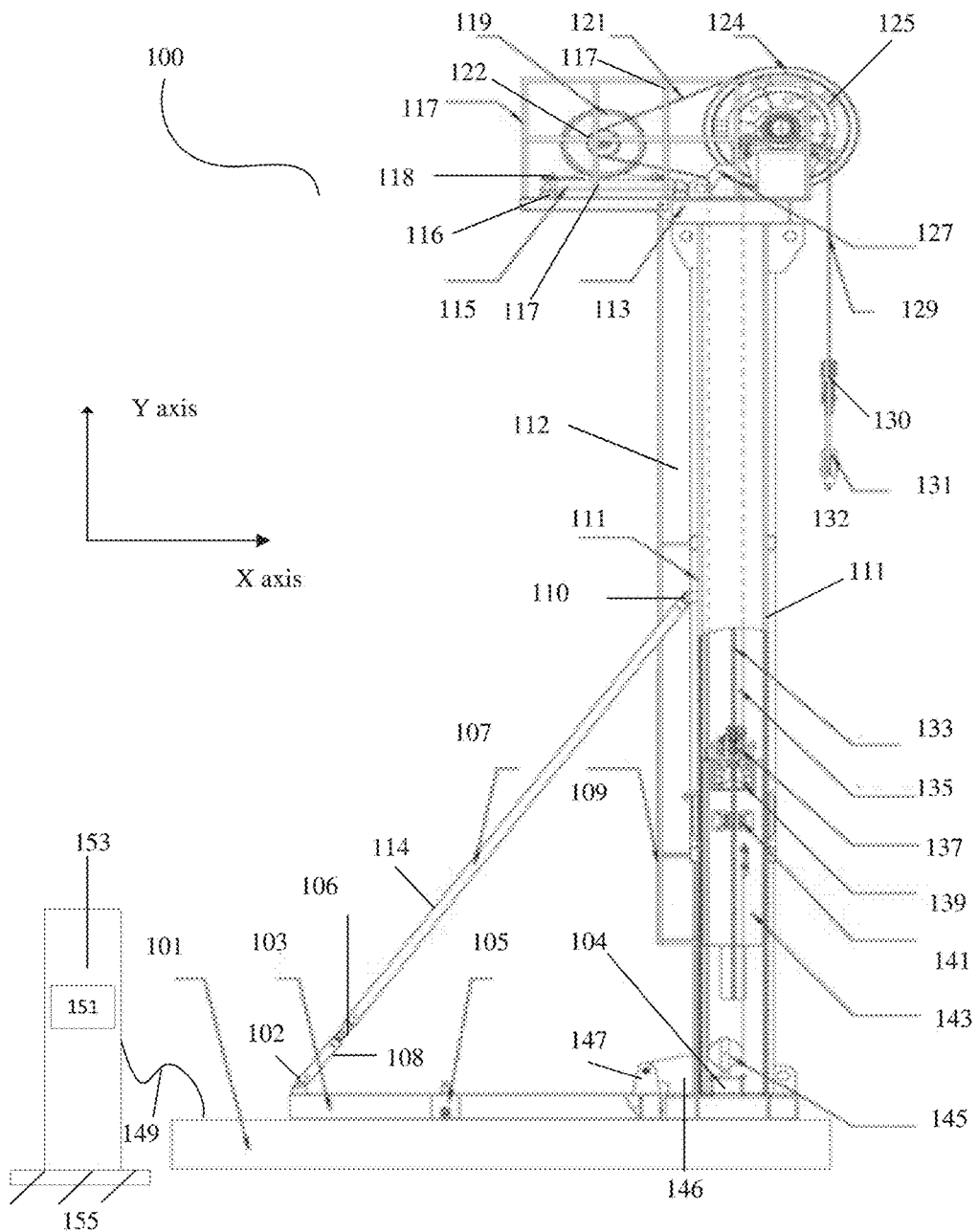
FIG. 1 is a side view of an oil pumping apparatus of the present disclosure.

The disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art Like reference numerals refer to like elements throughout.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the disclosure or of any exemplified term. Likewise, the disclosure is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the disclosure.

It will be understood that when an element is referred to as being "on", "attached" to, "connected" to, "coupled" with, "contacting", etc., another element, it can be directly on, attached to, connected to, coupled with or contacting the other element or intervening elements may also be present.

In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the disclosure.

Typically, terms such as "about," "approximately," "generally," "substantially," and the like unless otherwise indicated mean within 20 percent, preferably within 10 percent, preferably within 5 percent, and even more preferably within 3 percent of a given value or range. Numerical quantities given herein are approximate, meaning that the term "about," "approximately," "generally," or "substantially" can be inferred if not expressly stated.

Typically, specified widths can be smallest width (i.e. a width as specified where, at that location, the article can have a larger width in a different dimension), or largest width (i.e., where, at that location, the article's width is no wider than as specified, but can have a length that is greater), unless pointed out otherwise.

Embodiments of the disclosure are illustrated in detail hereinafter with reference to accompanying drawings. It should be understood that specific embodiments described herein are merely intended to explain the disclosure, but not intended to limit the disclosure. In accordance with the purposes of this disclosure, as embodied and broadly described herein, this disclosure, in certain aspects, relates to an oil pumping apparatus.

Referring to the drawings and, in particular, to FIGS. 1-6, an exemplary embodiment of an oil pumping apparatus of the present disclosure is generally referred to by reference numeral 100. Apparatus 100 has a cement base 101, an apparatus base 103 mounted on cement base 101, and a frame 112 having a fixed base 104 connected to both cement base 101 and apparatus base 103. Frame 112 supports a top platform 113. Top platform 113 includes a motor 119 mounted on a motor mount 115 to drive a load roller wheel 124 of a load roller 125 through a driven belt 121. Top platform 113 further includes a plurality of fences 117 surrounding motor 119, motor mount 115 and load roller 125.

In one embodiment, motor 119 is a high torque motor. The high toque motor may be an asynchronous motor, a direct current motor, a switched reluctance motor, or a permanent magnet synchronous motor. Motor 119 has a motor wheel 122 that is mounted on the output shaft of motor 119.

Motor 119 drives load roller wheel 124 through driven belt 121 to rotate load roller 125. The position of motor 119 can be adjusted through motor mount 115 so that motor 119 can drive load roller 125 properly. Specifically, the position of motor 119 can be adjusted horizontally via bolts 118 and vertically via footpads 116. Motor 119 is controlled by an electric control cabinet 153 via wires 149. Electronic control cabinet 153 has an automatic electric control system 151. Motor 119 has a motor shield (not shown) connected to top platform 113 and is supported on frame 112.

Driven belt 121 covers both motor wheel 122 and load roller wheel 124. In one embodiment, driven belt 121 is capable of tolerating extremely high torques. Driven belt 121 can be suitable for reverse flexing/reverse tensioning idlers. Driven belt 121 includes a hybrid tension member made of a glass carbon compound that enables demanding drive solutions and is usable in drives subject to high tensile loads, acceleration forces and shock loads. Driven belt 121 can be a maintenance-free belt and requires no lubrication or re-tensioning and transmits rotary motion with great angular precision. Driven belt 121 has high tear strength and dynamic load capacity, which enables synchronous drives to operate in extremely tight spaces. Driven belt 121 can be suitable for tropical climates, resistant to ozone and to oil, temperature-resistant from −30° C. or lower to +130° C. or higher. In one embodiment, driven belt 121 has a 14 mm pitch, a premier length 4326 mm, a belt width 90 mm with a safety factor larger than 1.8. In the present disclosure, different model numbers of the oil pumping apparatus can have different belt lengths, different belt pitches, different belt widths, depending on the motor torque powers. Driven belt 121 can speed up to 40 m/s or higher.

Figure 16:
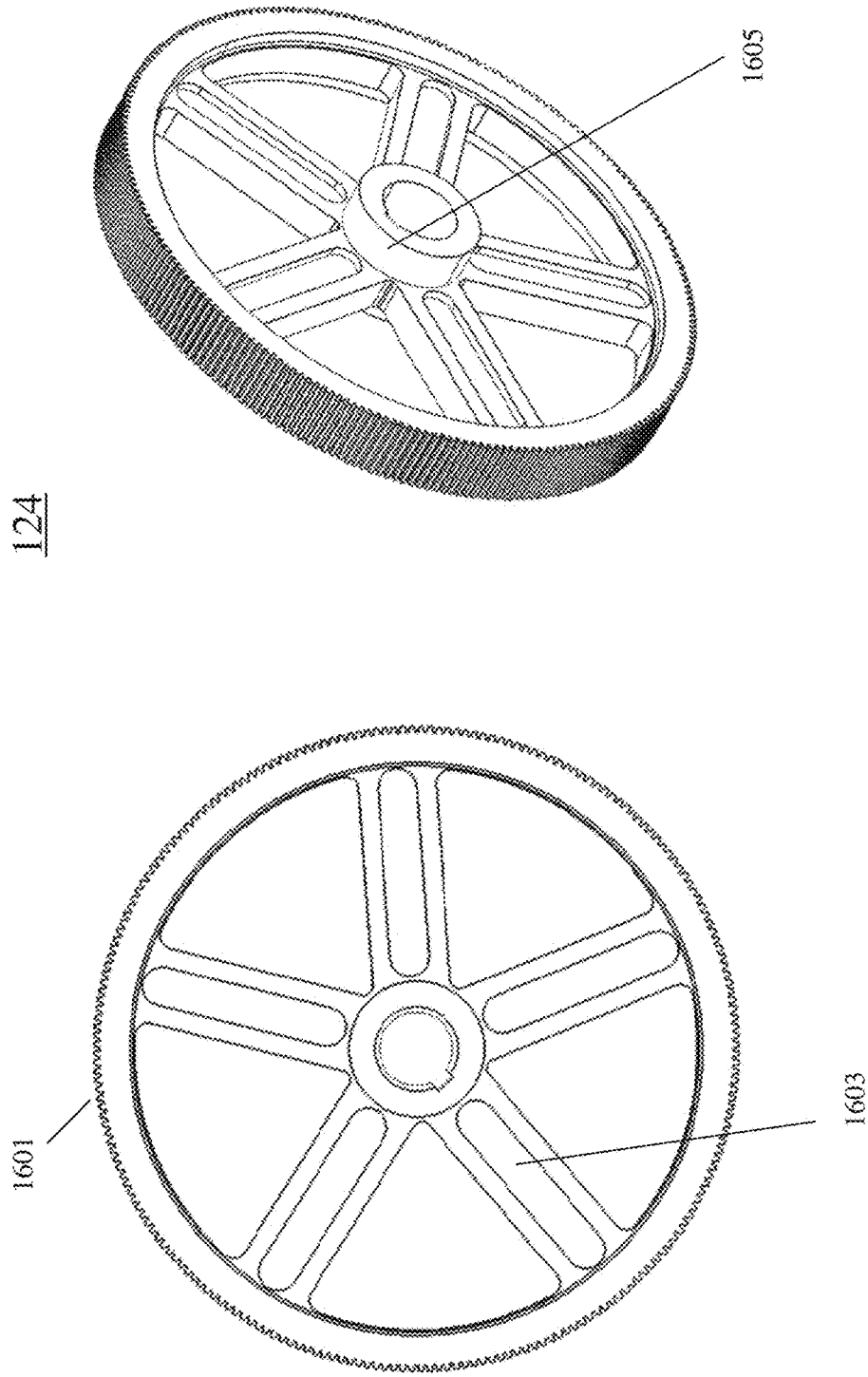
FIG. 16 shows an exemplary load roller wheel of the oil pumping apparatus of FIG. 1.

Load roller wheel 124 includes a plurality of teeth 1601, a plurality of ribs 1603, and a hub 1605 (shown in FIG. 16). Load roller wheel 124 is further described in FIG. 16.

Figure 2:
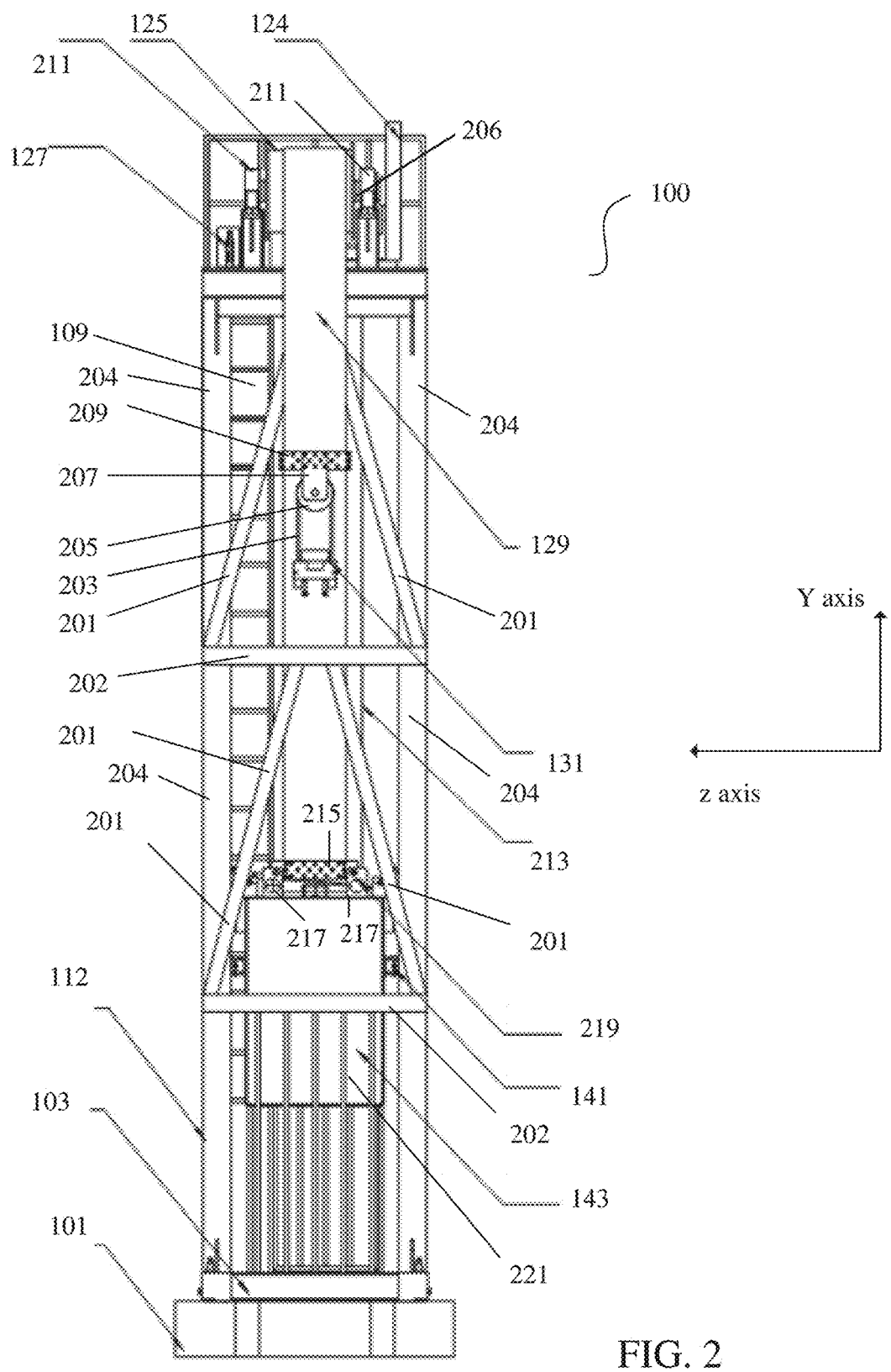
FIG. 2 is a front view of the oil pumping apparatus of FIG. 1.
Figure 3:
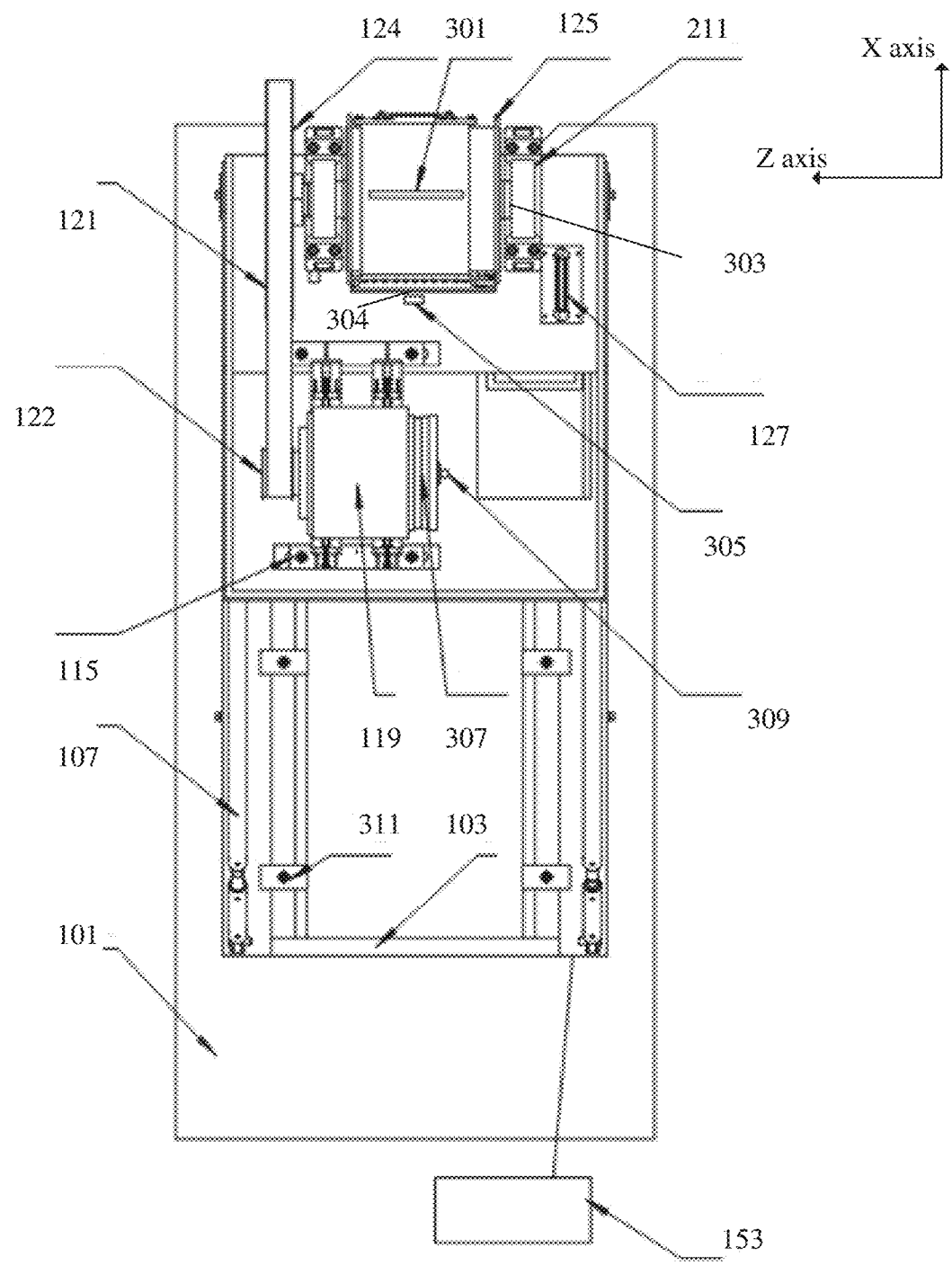
FIG. 3 is a top view of the oil pumping apparatus of FIG. 1.

Load roller 125 has a roller axle 303 that is parallel to a z-axis (shown in FIG. 3). Load roller 125 is rotatable about roller axle 303. Mechanical bearings can be installed between load roller 125 and roller axle 206 so that load roller 125 can be rotatable. Roller axle 303 is mounted with two load roller support seats 211 (shown in FIG. 2). Load roller support seats 211 are mounted on top platform 113. Each load roller support seat 211 can be made of stainless steel or any other material that is suitable for supporting load roller 125.

As shown in FIG. 1, on the right side of load roller 125, a device 132 connects to one end of load belt 129. On the left side of load roller 125, a balance box 143 connects to another end of load belt 129. The one end of load belt 129 is connected to a first connector 130, a connector 131 and device 132. The other end of load belt 129 is connected to balance box 143.

Load roller 125 carried the movement of load belt 129 by friction force between load roller 125 and load belt 129. The direction of the friction force across load belt 129 changes accordingly, depending on the location of load belt 129 with respect to load roller 125. Specifically, the direction of the friction force across load belt 129 on device 132 side is up while the direction of the friction force across load belt 129 is down on balance box 143 side. When load roller 125 rotates in a clockwise direction, device 132 moves down, and when load roller 125 rotates in an anticlockwise direction, device 132 moves up and connector 131 can pull up device 132.

Load roller 125 can be made of stainless steel. The diameter of load roller 125 is dependent on load requirements of connector 131. For example, when device 132 is heavy, load roller 125 has a larger diameter, and when device 132 is light, load roller 125 has a smaller diameter.

Load belt 129 wraps around about 180 degrees of load roller 125 so that the friction force across load belt 129 is in a first vertical direction (i.e., positive Y direction) on the device side of load roller 125 and the second friction force across load belt 129 is in a second vertical direction (i.e., negative Y direction), which is opposite to the first vertical direction, on the balance box side of load roller 125.

Load belt 129 can be plied textile belting. Load belt 129 can have multiple layers that include a cover layer, a skim rubber layer and a textile layer. In one embodiment, width of load belt 129 vary with load requirements of connector 131 and can be in a range of 450 millimeter ("mm") to 600 mm or more. In one embodiment, width of load belt 129 can be narrower than 450 mm. The weight of device 132 and balance box 143 are pressed on load roller 125 through load belt 129. The friction coefficient between load roller 125 and load belt 129 is preferably above 0.6, even though it can be lower than 0.6. The friction force between load roller 125 and load belt 129 is far greater than the load difference between device 132 and balance box 143 so that there is no slip between load roller 125 and load belt 129.

Apparatus 100 includes two guide rails 133. Guide rails 133 guide the movement of balance box 143 when balance box 143 moves up or down vertically. Guide rails 133 are mounted by bolts with frame 112 or welded with frame 112. Two guide wheels 141 are disposed on each side of balance box 143 to guide the movement of balance box 143 along two guide rails 133. Each of two guide rails is disposed between two guide wheels 141.

The below describes some other components of apparatus 100 in FIG. 1.

Cement base 101 is made of reinforced concrete. Cement base 101 can support a heavy load. In one embodiment of the present disclosure, cement base 101 can support a minimum load of 150 kilopascals ("kPa"). Most components of apparatus 100 are located on top of cement base 101.

Apparatus base 103 supports all the weight of the other components of apparatus 100 except cement base 101 and an electric control cabin 153. Apparatus base 103 can be made of stainless steel.

Fixed base 104 is connected to apparatus base 103. In one embodiment, fixed base 104 is welded to or bolted with apparatus base 103 through apparatus base clamps 105. Fixed base 104 connects with a first fixed pulley 145. In one embodiment, fixed base 104 includes a rectangular-shaped structure to connect to first fixed pulley 145.

Frame 112 is connected to apparatus base 103, preferably welded to apparatus base 103. Frame 112 is made of a material, for example, stainless steel. Frame 112 is preferably perpendicular to a ground 155. Alternatively, frame 112 can have an angle greater than or less than 90 degrees with ground 155. A rod 107 supports frame 112 through an upper hinge 110 and a lower hinge 102. Upper hinge 110 and lower hinge 102 prevent undesirable movement so that frame 112 will not flip over. Specifically, lower hinge 102 is connected to a short rod 108. A middle rod 106 is connected to a long rod 114 and short rod 108. Middle rod 106 and long rod 114 can be connected to threads, and middle rod 106 and short rod 108 can also be connected to threads.

Frame 112 has a plurality of vertical beams 221, a plurality of horizontal beams 202, a plurality of triangular beams 201, a plurality of side plate 111 and a plurality of side plates 204 (shown in FIG. 2). The above-mentioned plurality of vertical bar, horizontal bars, triangular bars and side plates are connected together, for example, by bolts or welded. Frame 112 has a rectangular bottom (shown in FIG. 10) resting on top of apparatus base 103 so that frame 112 maintains good stability for apparatus 100.

When it is desired for frame 112 to have an angle greater than or less than 90 degrees with ground 155, one end of long rod 114 is connected to a middle hinge (not shown) lower than upper hinger 110 and connected to frame 112. The slope angles can be varied depending on operation requirements of apparatus 100.

Connector 131 connects to first connector 130 and device 132. Specifically, one end of connector 131 is connected to device 132 that will be pulled by load belt 129, and the other end of connector 131 is connected to one end of first connector 130. In one embodiment, connector 131 can be a standard component for oil pumping devices. In one embodiment, first connector 130 is made of stainless steel.

Device 132 can be an oil container or any devices for pumping crude oil. Device 132 can be two or more devices that are in serial or parallel connections to connect with connector 131.

Further, apparatus 100 has a plurality of wires 149 connected to electric control cabin 153 mounted on ground 155 for signal communications. Electrical control cabin 153 cabin has automatic electric control system 151. Automatic electric control system 151 includes a programmable logic controller (PLC), a few switches and a series of cables/wires connected to the PLC and the switches.

Still further, apparatus 100 includes a load-removing mechanism. The load-removing mechanism includes load roller 125, two moving pulleys 219 disposed on the balance box 143 (shown in FIG. 7), an unloading wire rope 213 (shown in FIG. 2), and top platform 113. One end of unloading wire rope 213 is fixed with load roller 123 so that unloading wire rope 213 can be collected by load roller 123, and the other end of unloading wire rope 213 goes through two movable pulleys 219 of balance box 143 and connects to top platform 113. During normal operation, unloading wire rope 213 does not affect the operation of apparatus. When it is time to unload device 132, load roller 125 rotates to collect uploading wire rope 213 so that balance box 143 will be pulled up by load roller 125.

Furthermore, apparatus 100 includes a loss-of-load protection mechanism. The loss-of-load protection mechanism includes a speed limiter 127 mounted on top platform 113, a loss-of-load protection wire rope 135, connecting rod assembly 137, clamp assembly 139, first fixed pulley 145, balance box 143, and guide rails 133. Speed limiter 127 is mounted on top platform 113 of apparatus 100. First fixed pulley 1455 is installed at the lower portion of frame 112. Loss-of-load protection wire rope 135 bypasses both speed limiter 127 and first fixed pulley 145. One end of loss-of-load protection wire rope 135 is connected to a driving crank 921 (shown in FIG. 9) of connecting rod assembly 137 and the other end of loss-of-load protection wire rope 135 is connected to balance box 143. Connecting rod assembly 137 is mounted with balance box 143. Two clamp assemblies 139 are installed on the upper and sides of the balance box 143. Wedge clamping pieces 811 are distributed on both sides of guide rails 133, and guide rails 133 are welded to frame 112. When the weight of device 132 is disconnected from apparatus 100, speed limiter 127 holds loss-of-load protection wire rope 135, and loss-of-load protection wire rope 135 drives driving crank 921 of connecting rod assembly 137 so that wedge clamping pieces 811 clamp one of two guide rails 133 and two clamp assemblies 139 clamp guide rails 133 to prevent balance box 143 from falling.

Moreover, apparatus 100 further has a ladder 109. An operator 1429, shown in FIG. 14, can climb to top platform 113 through ladder 109.

FIG. 2 is a front view of the oil pumping apparatus of FIG. 1, frame 112 has a plurality of triangular beams 201, a plurality of horizontal beams 202, a plurality of side plates 204, and a plurality of vertical beams 221.

In one embodiment, one end of load belt 129 is connected to first connector 130 and/or connector 131. In one embodiment, first connector 130 has a first horizontal plate 209, and one end of load belt 129 is connected to first horizontal plate 209, for example, by bolts. First horizontal plate 209 is further connected to a first vertical plate 207. A second fixed pulley 205 is rotatable about first vertical plate 207 and holds a connecting rope 203 connected to connector 131

Two load roller support seats 211 support load rollers 125 that is rotatable about roller axle 303.

Unloading wire 213 is to unload device 132. Specifically, one end of unloading wire rope 213 is fixed with load roller 123, and the other end of unloading wire rope 213 goes through two moving pulleys 219 of balance box 143 and is fixed with top platform 113. When it is time to unload device 132, load roller 125 is driven by motor 119 to rotate in a clockwise direction, so load roller 125 will collect unloading wire rope 213 and pulls up balance box 143 until device 132 can be unloaded.

In one embodiment, the other end of load belt 129 is connected to a second horizontal plate 215, for example, by bolts. Second horizontal plate 215 is connected to two balance box lifting lugs 217 on the left side of second horizontal plate 215 and another two balance box lifting lugs 217 on the right side of second horizontal plate 215. Movable pulley 219 is installed between two balance box lifting lugs 217 (shown in FIG. 7).

FIG. 3 illustrates a top view of the pumping apparatus of FIG. 1.

Apparatus 100 further has a reference soft iron 301 that is inserted in load belt 129, a reference position switch 305 connected to frame 112, a power-off brake 307 installed at the end of high torque motor 119, and an encoder 309 mounted on the shaft of motor 119 and disposed on the outside of power-off brake 307.

Reference soft iron 301 is inserted in a middle section of load belt 129. Reference position switch 305 is mounted with top platform 113. The material of the reference soft iron 301 can be soft iron, carbon steel or even semiconductor material. Preferably, the material of reference soft iron 301 is soft iron. Soft iron has a low content of carbon and is easily magnetized and demagnetized.

Reference soft iron 301 works with reference position switch 305 to record a zero reference position 304 of load belt 129. When reference soft iron 301 moves to a closest position to reference position switch 305, reference position switch 305 sends a pulse signal to a PLC 1421. PLC 1421 sets the closest position as zero reference position 304. After load belt 129 passes zero reference position 304, load roller 125 keeps rotating, any distance that load roller rotates is recorded as a negative distance. When the negative distance reaches a lower pre-determined threshold set by PLC 1421, PLC 1421 sends a command to a motor controller 1403 (shown in FIG. 14) that changes phases of input currents so that motor 119 can operate in a reverse direction. As shown in FIG. 1, when motor 119 rotates in a clockwise direction, load roller 125 rotates in a clockwise direction.

Similarly, when load roller 125 rotates in an anticlockwise direction, motor 119 also rotates in the anticlockwise direction, which is driven by the friction force between driven belt 121 and load roller wheel 124. As reference soft iron 301 moves to a closest position to reference position switch 305, reference position switch 305 sends another pulse signal to PLC 1421. PLC 1421 sets this closest position again as zero reference position 304. Any distance after reference soft iron 301 passed by zero reference position will be recorded as a positive distance. When the positive distance reaches an upper predetermined threshold set by PLC 1421, PLC 1421 sends another command to motor controller 1403 to change phases of input currents for motor 119 so that the motor operates in another reverse direction, that is, rotates in a clockwise direction.

Figure 14:
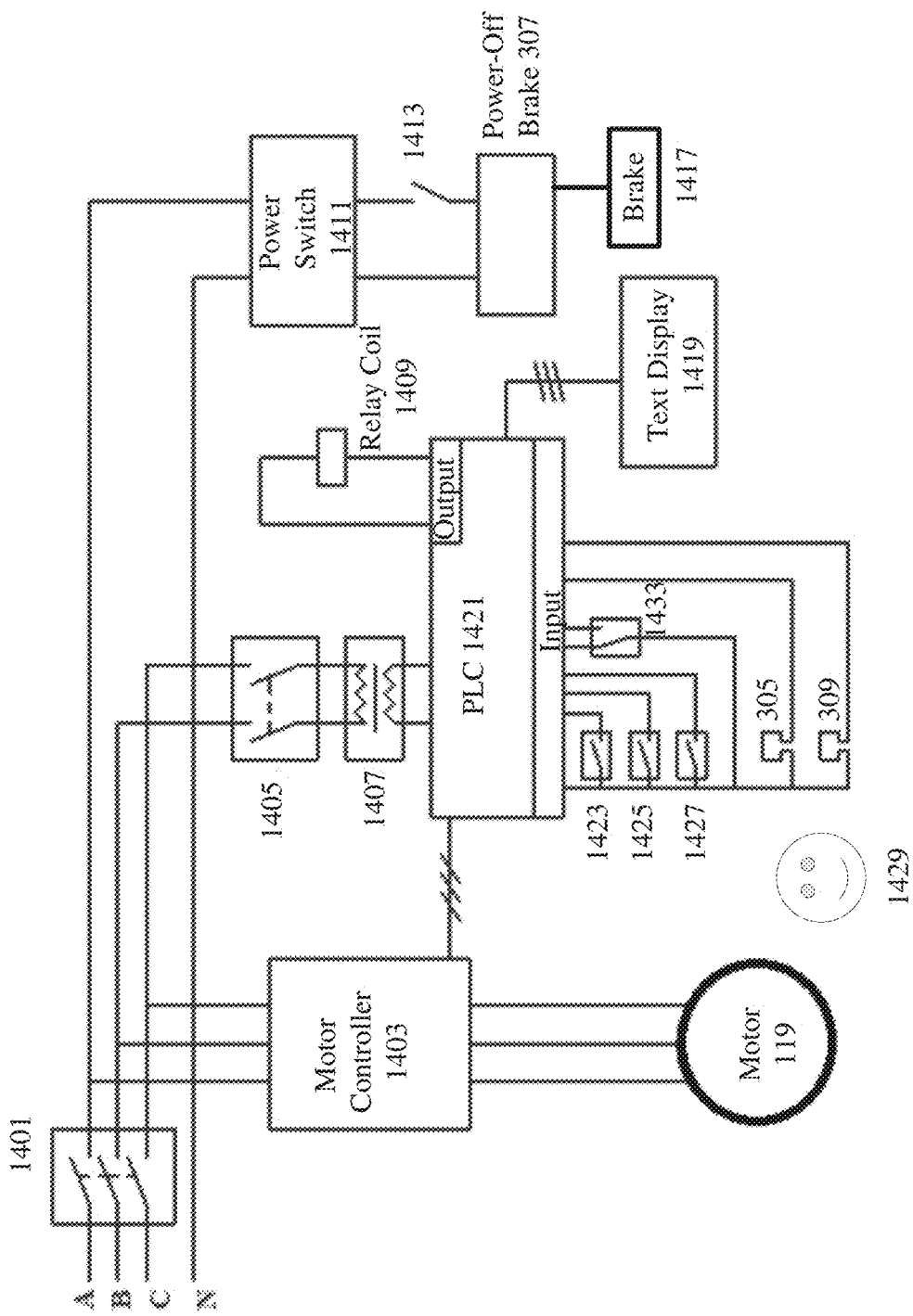
FIG. 14 is a block diagram of an electronic control system of the oil pumping apparatus of FIG. 1.

Power-off brake 307 has a brake 1417 (shown in FIG. 14). Power-off brake 307 can control start and stop of motor 119. The control mechanism of power-off brake 307 is further descried in FIG. 14.

Encoder 309 records the rotation movement of motor 119 relative to motor mount 115, and sends pulse signals to PLC 4121, which then calculates the linear movement of load belt 129. Because encoder 309 is mounted with motor 119, when electrical motor rotates one additional cycle, encoder 309 will add "1" to a total rotation number of motor 119. Driven belt 129 covers both motor wheel 122 and load roller wheel 124. An ordinary skill in the art can understand that the linear moving distance of load belt 129 can be calculated mathematically when the parameters of the diameters of motor wheel 122, load belt wheel 124, load roller 125 and other geometry parameters are known.

Anchor bolts 311 are used to mount two motor mounts 115 on top platform 113.

Figure 4:
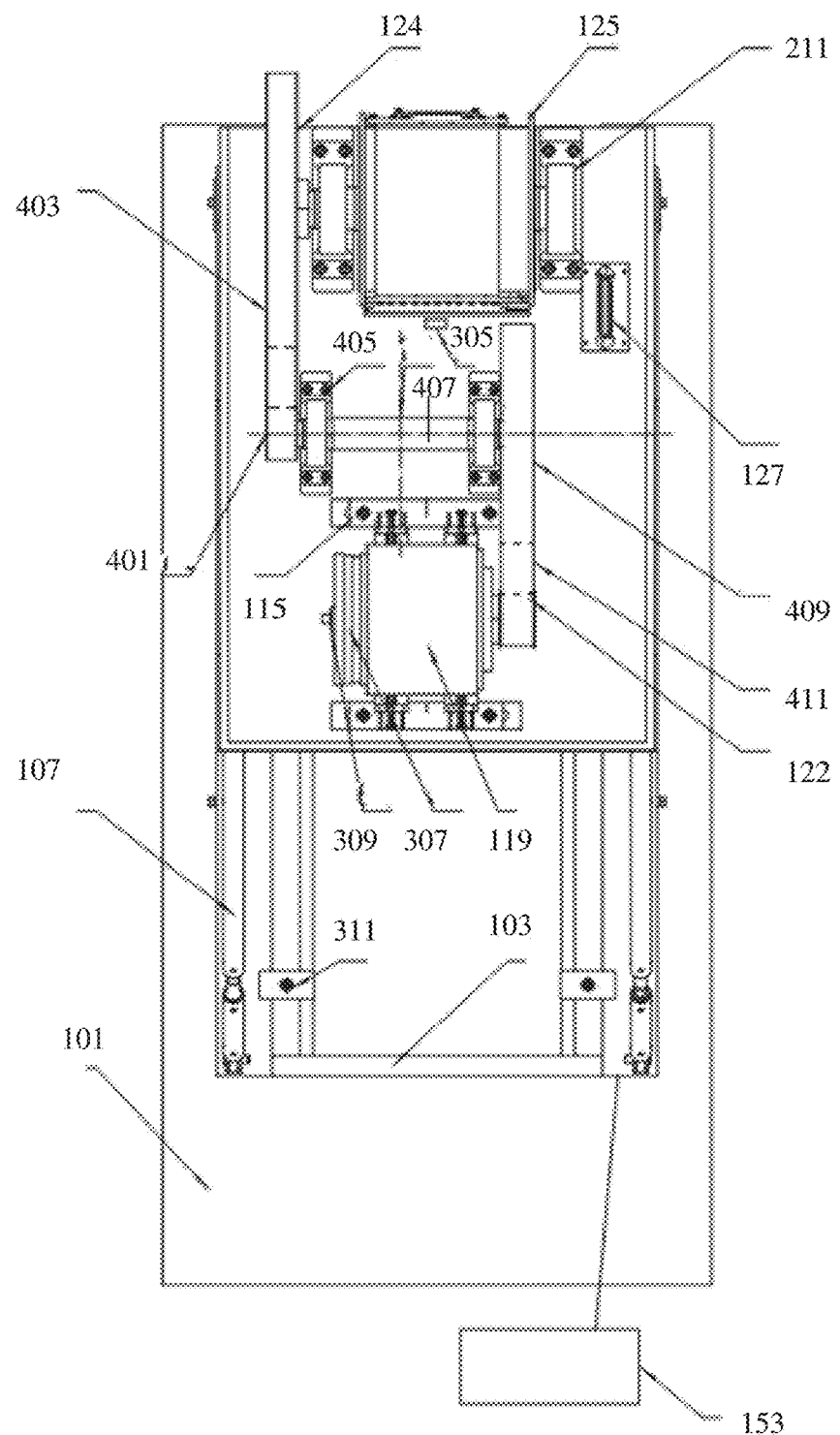
FIG. 4 is a top view of another embodiment of the oil pumping apparatus of FIG. 1.

Referring to FIG. 4, in addition to the scheme of FIG. 3, another scheme shown in FIG. 4 may be used. Specifically, an intermediate shaft 407 is installed between electrical motor wheel 122 and load roller wheel 124. Immediate shaft 407 is supported by immediate shaft supports 405. As show in FIG. 4, a middle shaft wheel 401 is disposed on the left end of immediate shaft 407 and a deceleration wheel 409 is disposed on the right end of immediate shaft 407. A middle shaft driven belt 403 covers both middle shaft wheel 401 and load roller wheel 124, and a deceleration driven belt 411 covers both deceleration wheel 409 and electrical motor wheel 122.

Load roller wheel 124 has a first diameter and electrical motor wheel 122 has a second diameter. Deceleration wheel 409 has a third diameter and middle shaft wheel 401 has a fourth diameter. In one embodiment, the third diameter is larger than the second diameter, but smaller than the fourth diameter. In another embodiment, the third diameter is equal to the fourth diameter. In another embodiment, the first diameter is at least 5 times of the second diameter in accordance with load requirements of device 132.

Deceleration wheel 409 and middle shaft wheel 401 may be a V-belt pulley and may also be a timing belt pulley. In one embodiment, middle shaft driven belt 403 and deceleration driven belt 411 will be similar or substantially similar to driven belt 121.

Figure 5:
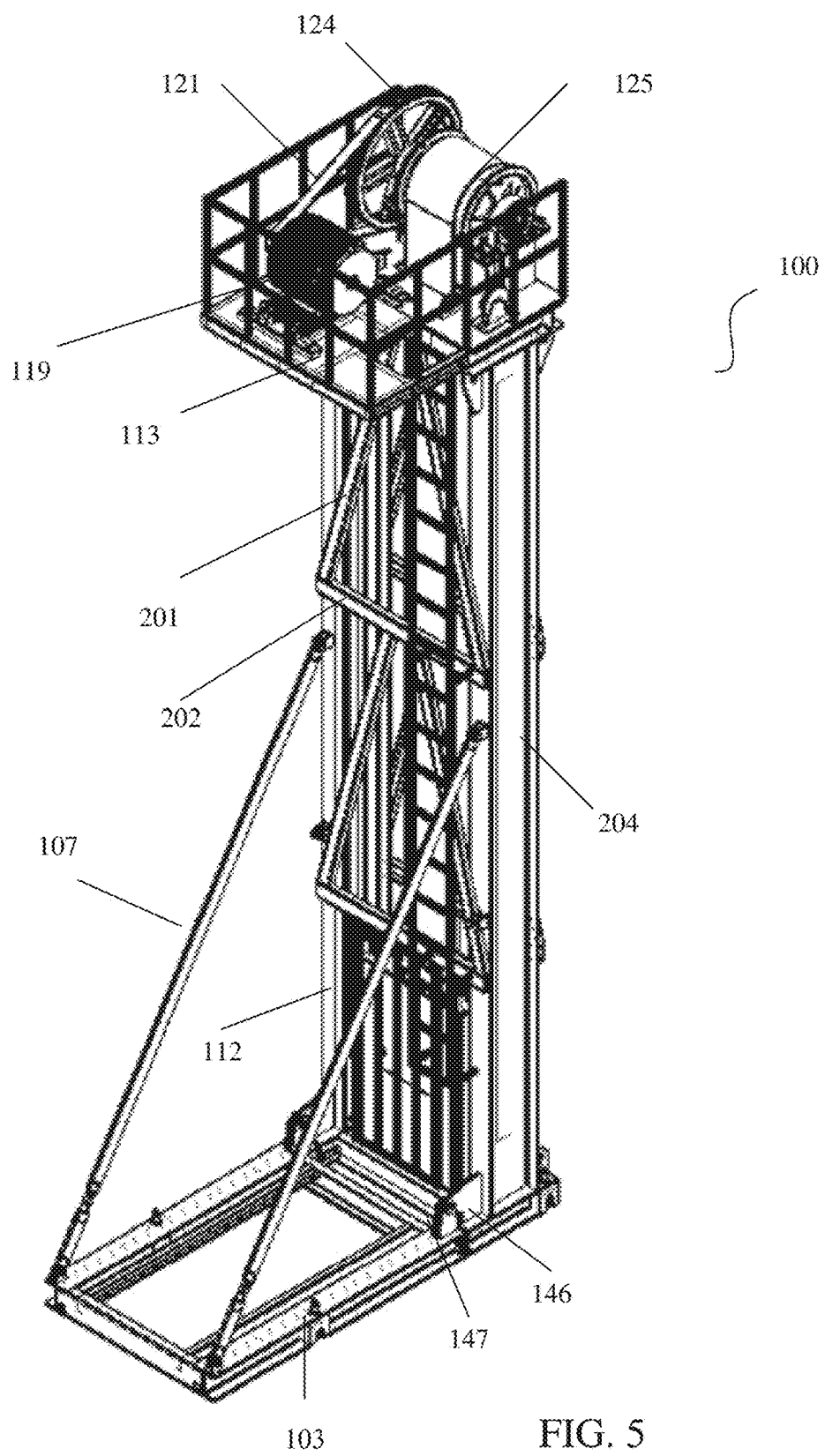
FIG. 5 is a back perspective view of the oil pumping apparatus of FIG. 1.
Figure 6:
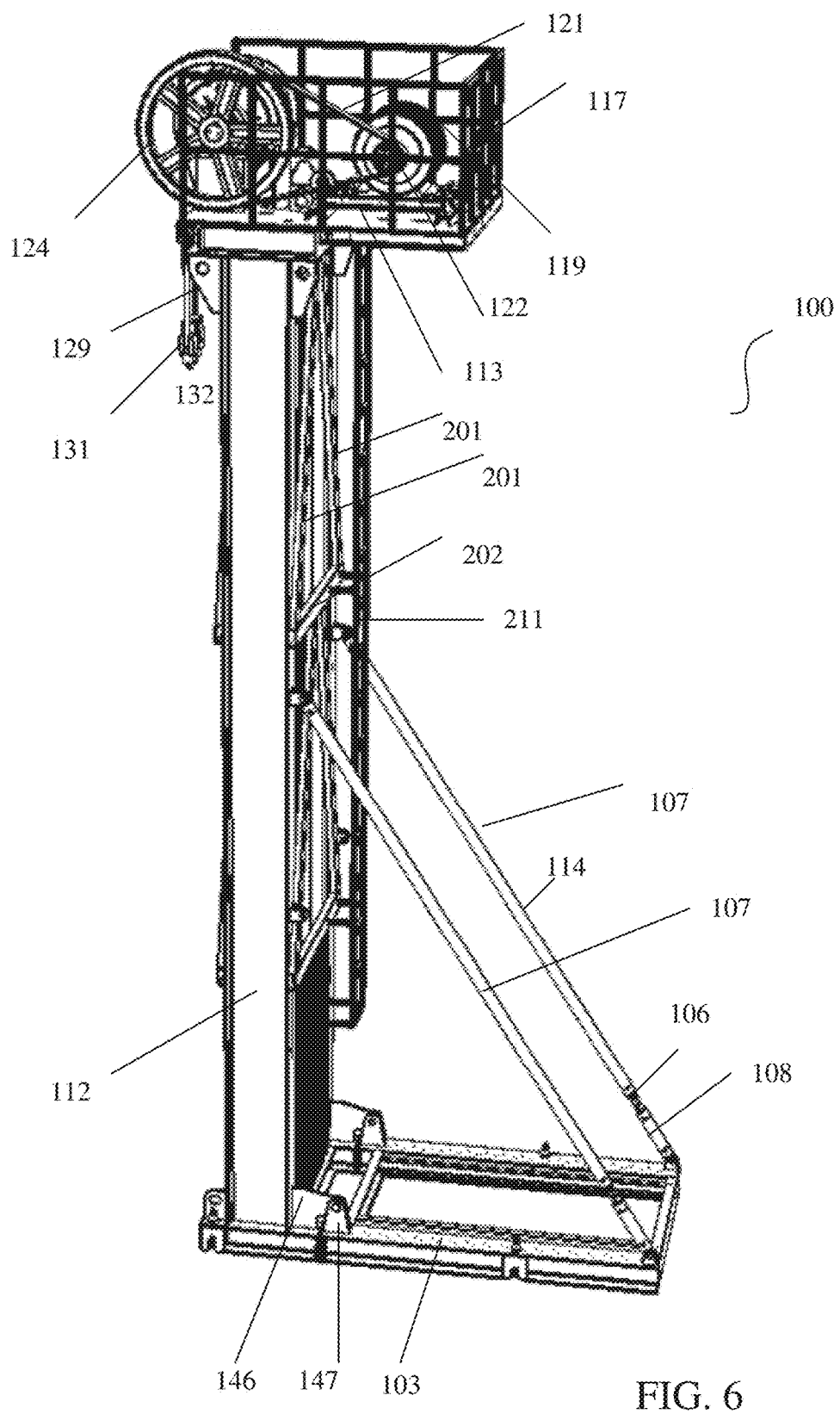
FIG. 6 is a side perspective view of the oil pumping apparatus of FIG. 1.

Referring to FIGS. 1, 5 and 6, frame 112 has a first connecting plate 146, and apparatus base 103 has a second connecting plate 147. First connection plate 146 and second connecting plate 147 are connected by bolts. Apparatus 100 is supported by two rods 107 that can be adjustable among long rod 114, middle rod 106 and short rod 108. Again, on top platform 113, motor 119 drives load roller 125 through driven belt 121 and load roller wheel 124. A plurality of fences 117 surrounds motor 119, load roller wheel 124, and load belt 121. Load belt 129 is connected to device 132 through connector 131.

Figure 7:
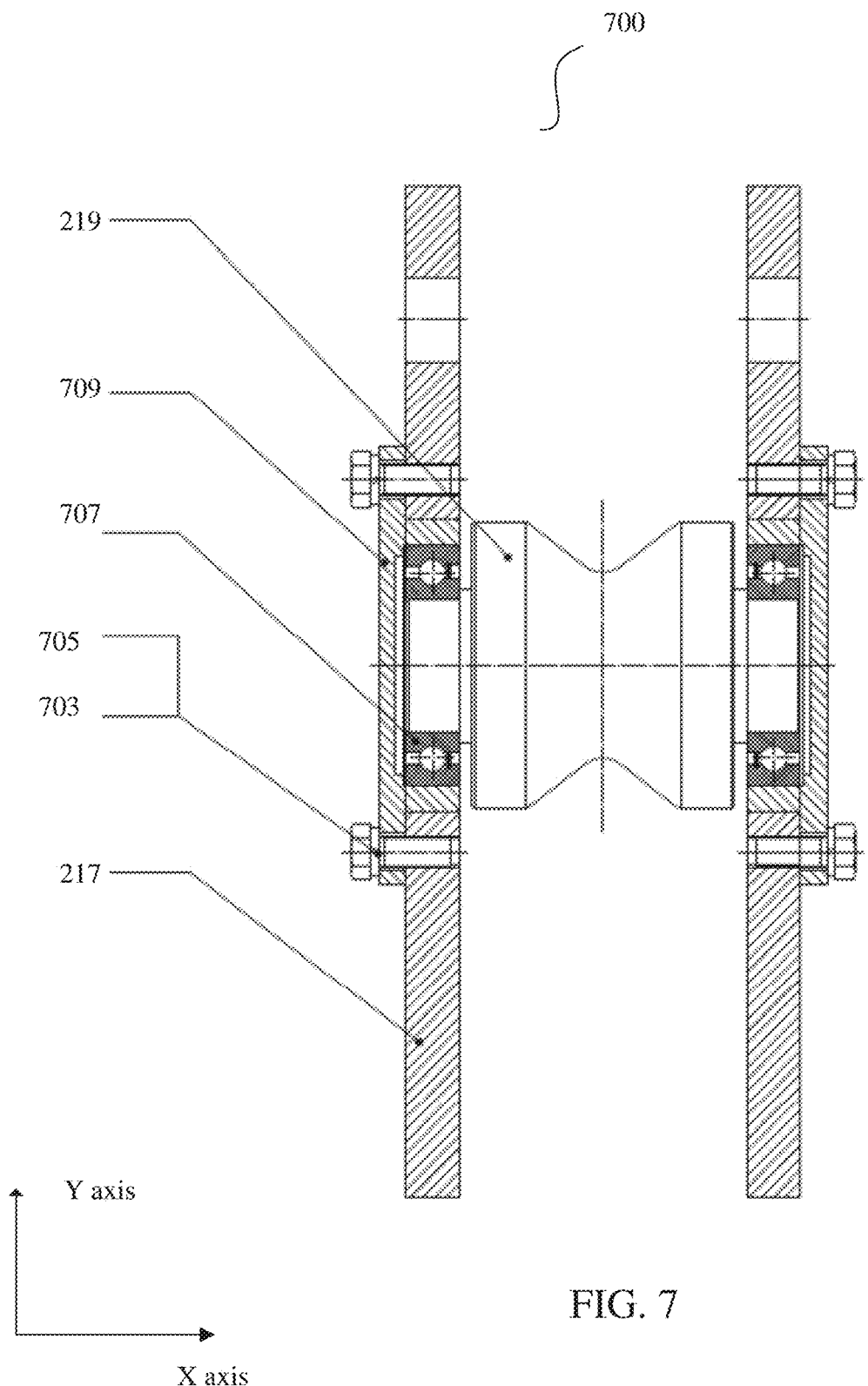
FIG. 7 is a side view of a moveable pulley assembly of the oil pumping apparatus of FIG. 1.

FIG. 7 is a side view of a moveable pulley assembly 700 of oil pumping apparatus 100. Movable pulley assembly 700 is connected to balance box 143 and is further illustrated in FIG. 12 of the present disclosure. Movable pulley assembly 700 includes balance box lifting lug 217, bolts 703 and washers 705, ball bearings 707 to rotate balance box movable pulley 219 and a cover plate 709. Balance box movable pulley 219 is rotatable about an x axis. Again, one end of unloading wire rope 213 is fixed with load roller 125 and the other end of unloading wire rope 213 goes through two movable pulleys 219 of balance box 143 and connects to top platform 113 so that balance box 143 can be unloaded because load roller 125 collects unloading wire rope 213.

Figure 8:
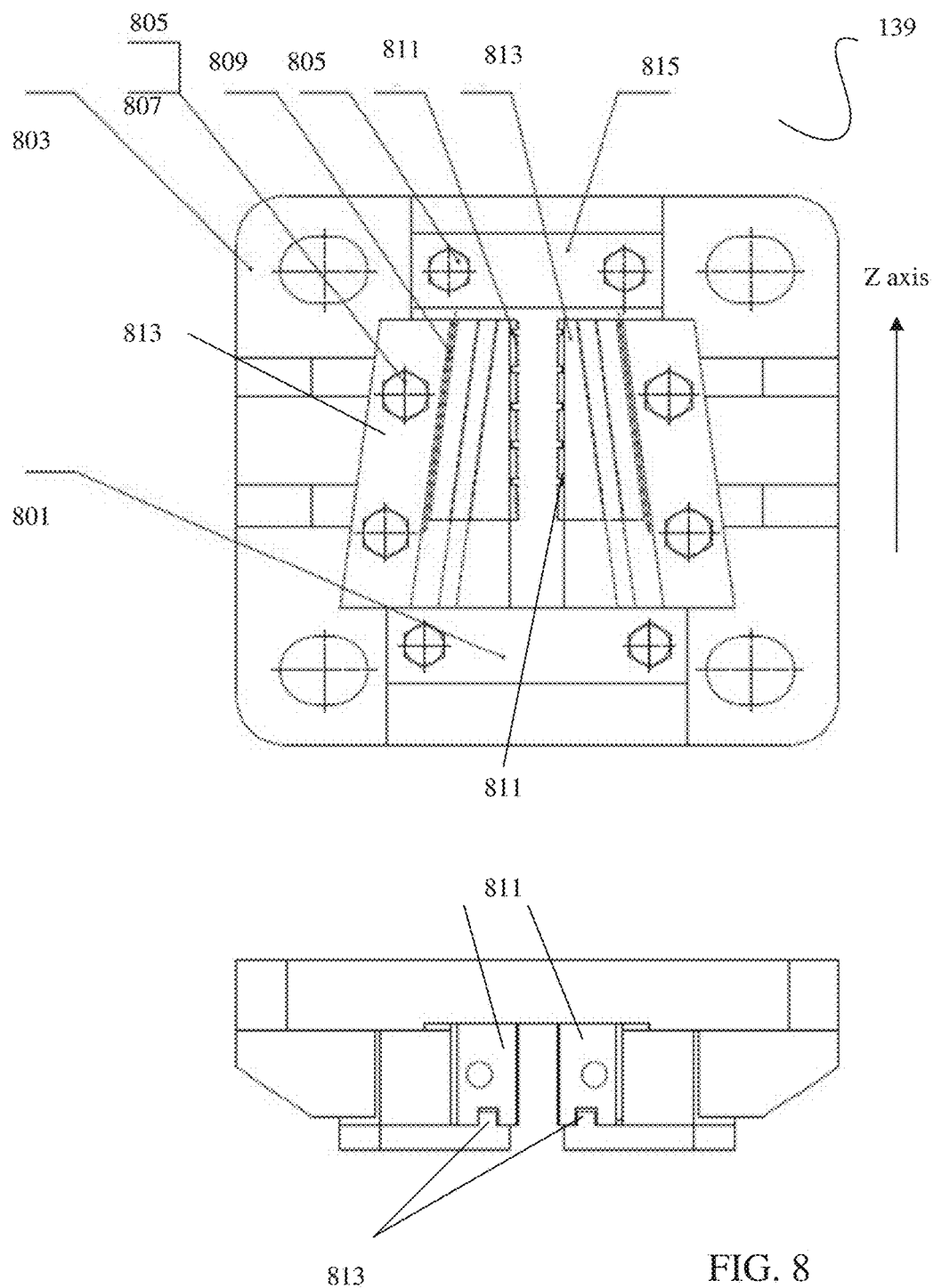
FIG. 8 illustrates an exemplary clamp of the oil pumping apparatus of FIG. 1.

FIG. 8 illustrates an exemplary clamp assembly 139 of oil pumping apparatus 100. Clamp assembly 139 includes a lower baffle 801, a wedge block seat 803 to support wedge blocks 813, bolts 805 and washers 807 to mount wedge blocks 813 with wedge block seat 803, needle roller bearings 809 to move wedge clamping pieces 811 up and down, wedge blocks 813 and an upper baffle 815. Wedge clamping pieces 811 are movable along a z-axis through needle roller bearings 809. As wedge clamping pieces 811 move up along the z axis, the distances between wedge clamping pieces 811 on the left and right become shorter and shorter so that guide rails 133 on frame 112 can be clamped by wedge clamping pieces 811. Accordingly, balance box 142 will not move down any further when device 132 is disconnected from apparatus 100.

Figure 9:
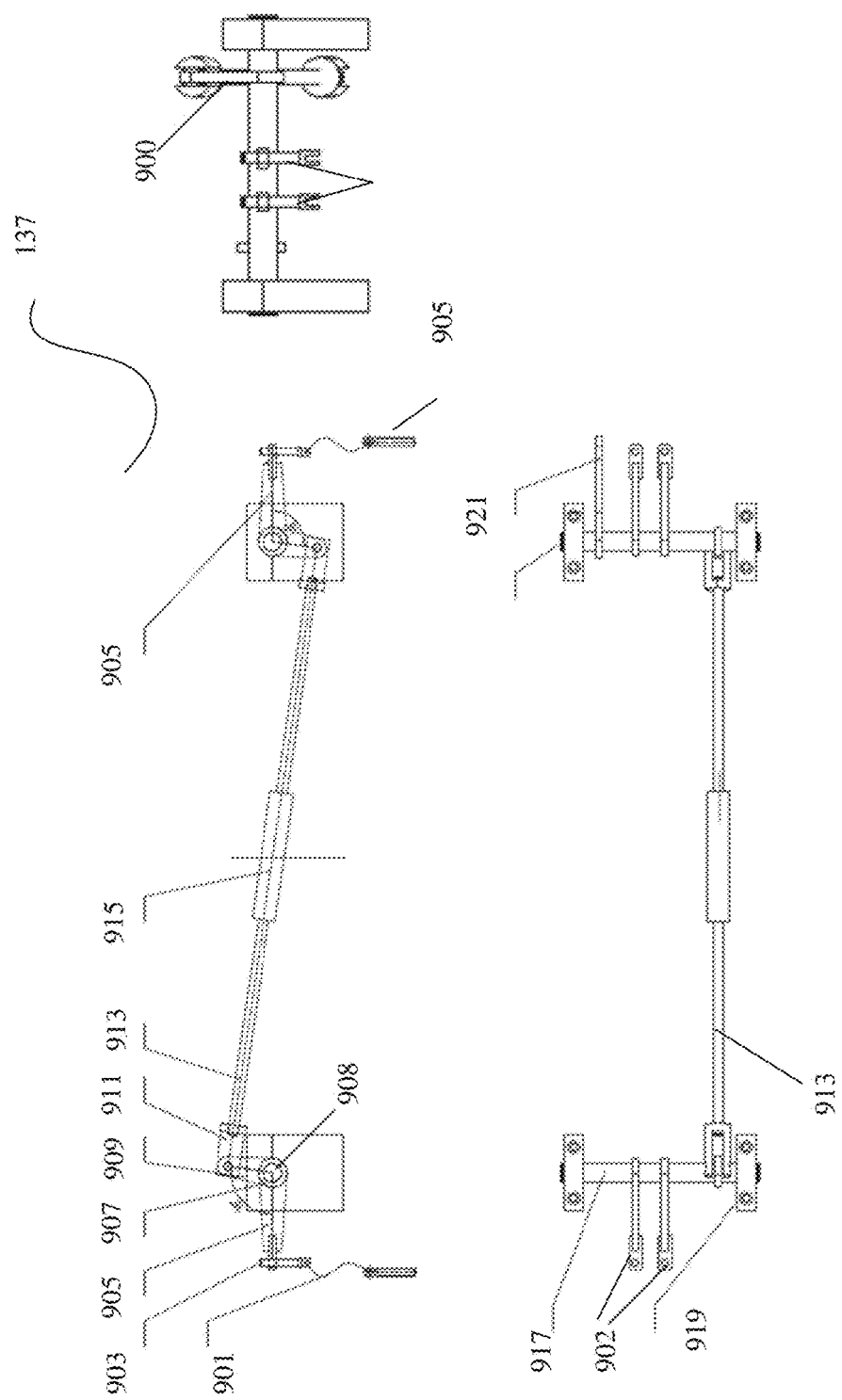
FIG. 9 illustrates an exemplary connecting rod of the oil pumping apparatus of FIG. 1.

FIG. 9 illustrates an exemplary connecting rod assembly 137 of oil pumping apparatus 100. Connecting rod assembly 137 includes a pulling chain 901 connected to a pulling screw rod 903, a crank 905, and a crank cover 907 covering crank 905 and a connecting crank 909, wherein crank 905 and connecting crank 909 are rotatable about a common axle 908. Connecting rod assembly 137 further includes a latch ear 911, a screw rod 913, a connecting screw rod 915 connected to screw rods on the left and right, a crank shaft 917, a crank shaft seat 919 to support crank shaft 917, a driving crank 921 and a retaining ring 923. Connecting rod assembly 137 has these components mechanically connected to each other, as shown in FIG. 9. Connecting rod assembly 137 still further includes two linking members 902 that connect to another two linking members 1201 (shown in FIG. 12). Driving crank 921 is connected to one end of loss-of-load protection wire rope 135. When loss-of-load protection wire is held by speed limited 127, loss-of-load protection wire rope 135 drives driving crank 921 of connecting rod assembly 137. Driving crank 921 will drive the movements of two linkage movements 902 on the left and two linkage members 902 on the right. Accordingly, two linking members 902 are pulled up, another two linking members 1201 linked with two linking members 902 (shown in FIG. 12) will be pulled up correspondingly. As a result, the distances between wedge clamping pieces 811 on the left and right become shorter and shorter so that guide rails 133 bolted or welded with frame 112 will be clamped by wedge clamping pieces 811 and balance box 142 will not move down any more.

Figure 10:
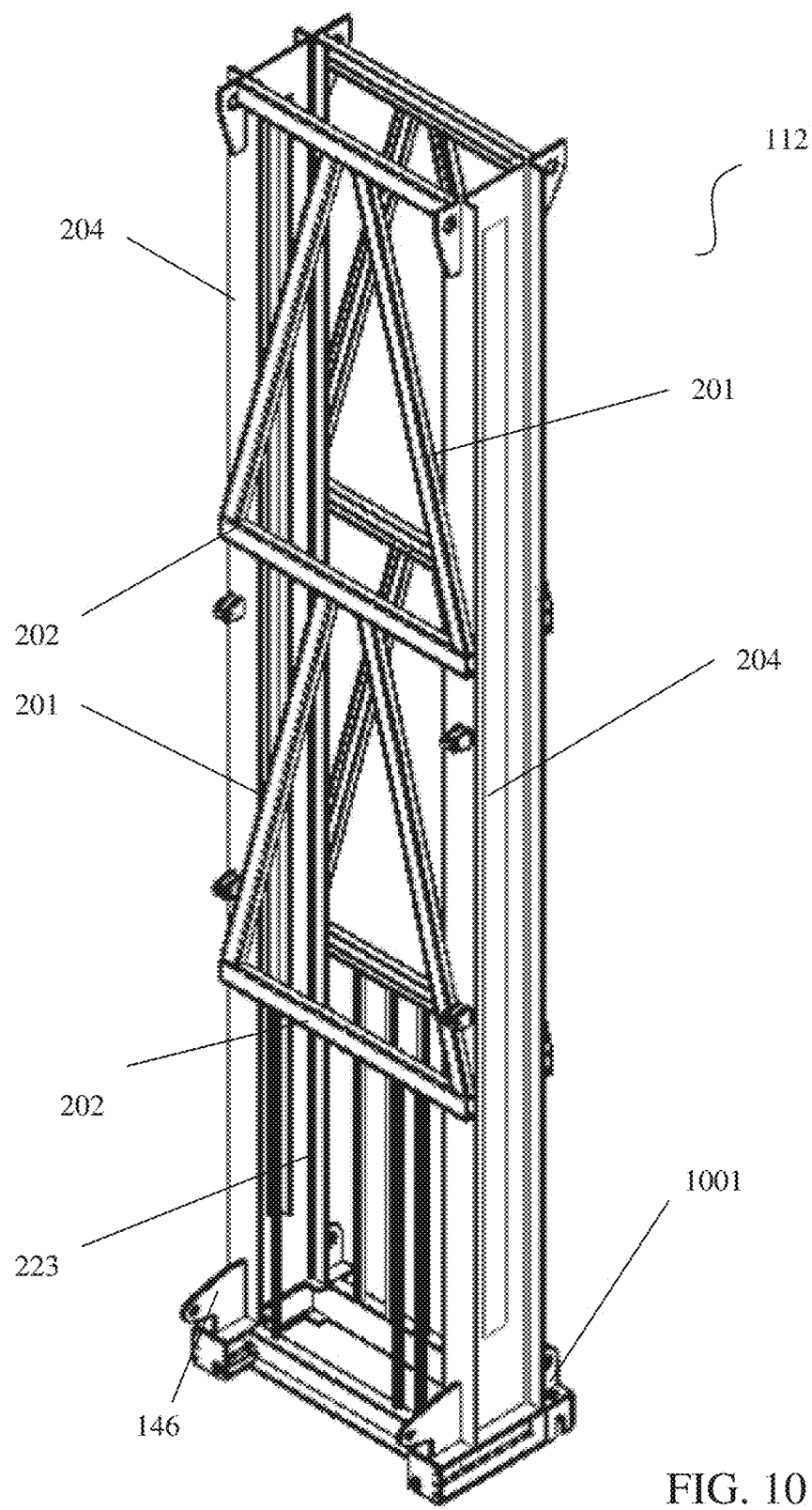
FIG. 10 is a side perspective view of a frame of the oil pumping apparatus of FIG. 1.

FIG. 10 is a side perspective view of frame 112 of the oil pumping apparatus of FIG. 1. Frame 112 includes a plurality of vertical beams 221, a plurality of horizontal beams 202, a plurality of triangular beams 201, and a plurality of side plates 204. Frame 112 further includes a walking mechanism 1001 having a drive roller that frame can be movable. Embodiment of a shift system to move apparatus 100 can be found in Chinese Application No. 200620081257.5 titled by "vertical pumping unit shifting devices". When apparatus 100 is required to be moved around, the wellhead load such as device 132 is removed, and the fixed base is loosened. When anchor bolt 311 are removed, there will be a little gap left between frame 112 including the attached components and cement base 101. With a transfer wrench to turn the driver rollers of a moving mechanism so that the pumping apparatus can be moved away, from the wellhead for 0.7 meter or more to meet the oil well operation need.

Figure 11:
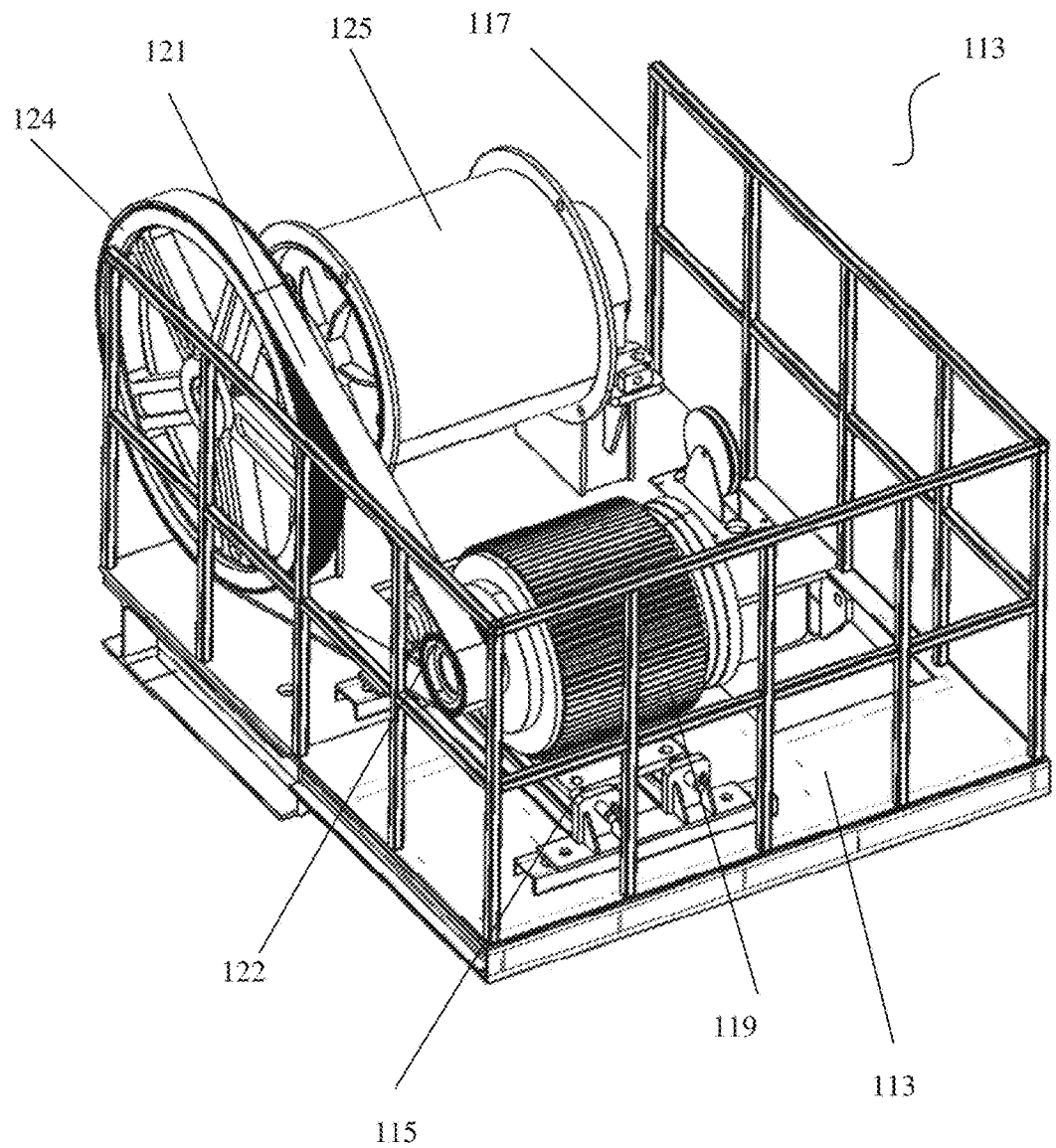
FIG. 11 is a back perspective view of a top platform of the oil pumping apparatus of FIG. 1.

FIG. 11 is a back perspective view of a top platform of the oil pumping apparatus of FIG. 1. Top platform 113 includes driven belt 121, load roller wheel 124, load roller 125, the plurality of fences 117, motor 119, motor wheel 122, and motor mount 115, as discussed above.

Figure 12:
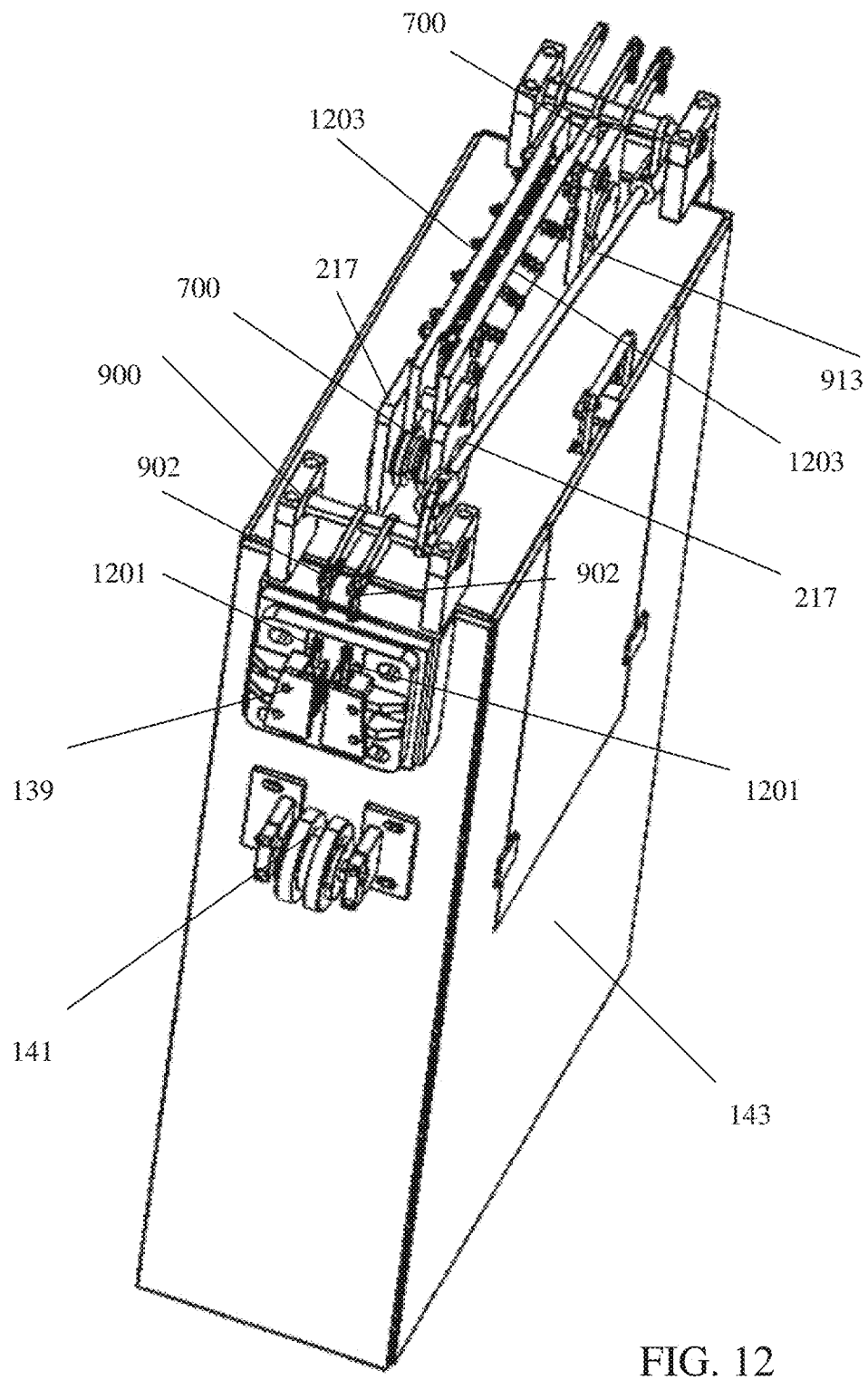
FIG. 12 is a side perspective view of a power-off break assembly of the oil pumping apparatus of FIG. 1.

FIG. 12 is a side perspective view of a power-off break assembly of the oil pumping apparatus of FIG. 1. Power-off break assembly 1200 includes (1) balance box 143; (2) clamp assembly 139 including two linking members 1201 disposed on each side of balance box 143; (3) two guide wheels 141 disposed on each side of balance box 143 to guide the movement of balance box 143 along guide rails 133; (4) two movable pulley assemblies 700; and (5) fixed plates 1203 to clamp load belt 129 by bolts. Two linking members 1201 are linked with two linking members 902 of connecting rod assembly 137 correspondingly. When two linking members 1201 are moved up so that guide rails can be clamped by clamp assembly 139.

Figure 13:
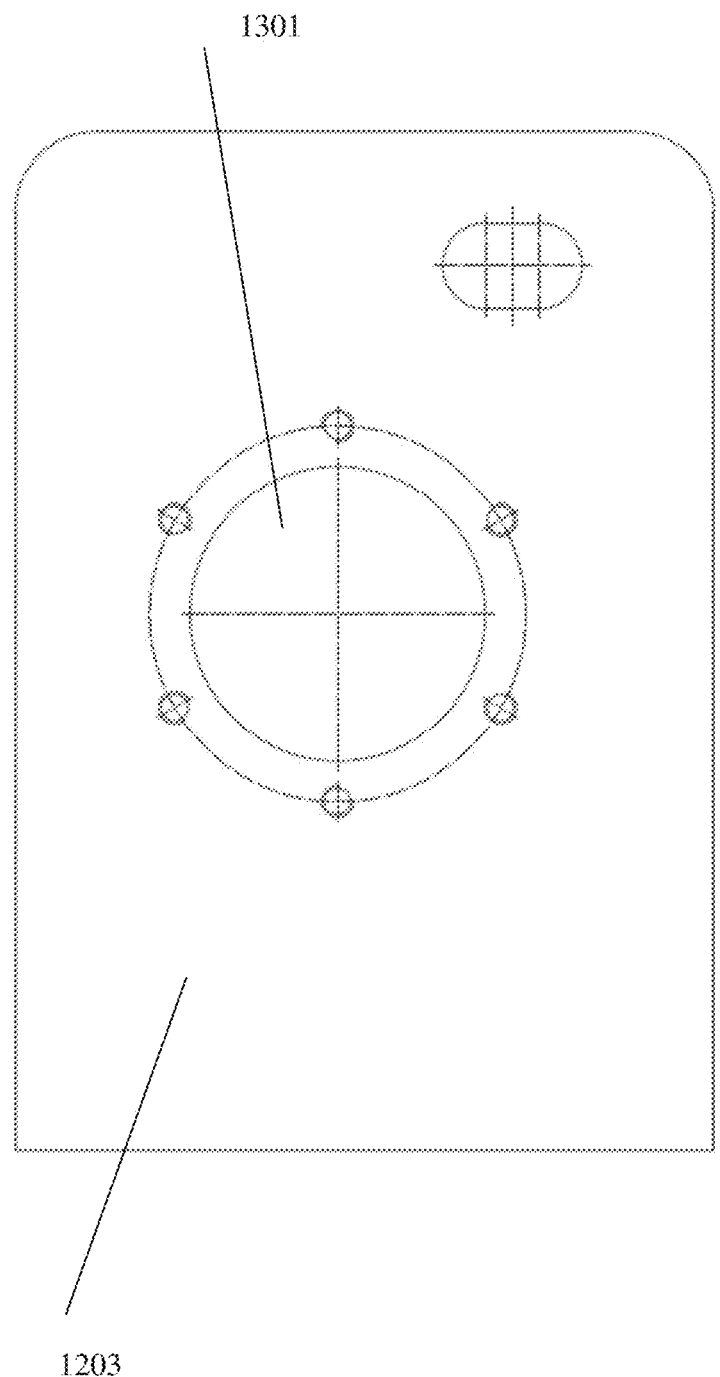
FIG. 13 is a front view of a lifting lug of the oil pumping apparatus of FIG. 1.

FIG. 13 is a front view of lifting lug 217 of the oil pumping apparatus of FIG. 1. Lifting lug 217 has an aperture 1301 to install balance box movable pulley 219.

Referring to FIG. 14, automatic electronic control system 151 of apparatus 100 has a power switch 1401 to supply power of apparatus 100, motor controller 1403 that controls the operation of motor 119, a transformer 1407, a transformer switch 1405, a power switch 1411, a normal open relay switch 1413, power-off brake 307 that has brake 1417, a relay coil for brake control 1409, PLC 1421, an upwards start button 1423, a downwards start button 1425, a stop button 1427, reference position switch 305, encoder 309, a manual/automatic switch 1433, and a text display 1419.

Power switch 1401 provides power for apparatus 100. The power has three phase inputs A, B, C and a grounded phase N. Motor controller 1403 has three-phase inputs. Transformer switch 1405 and transformer 1407, and PLC 1421 have phases B and C as inputs. Power-off brake 307 has phase A and grounded phase N as power inputs.

Figure 15:
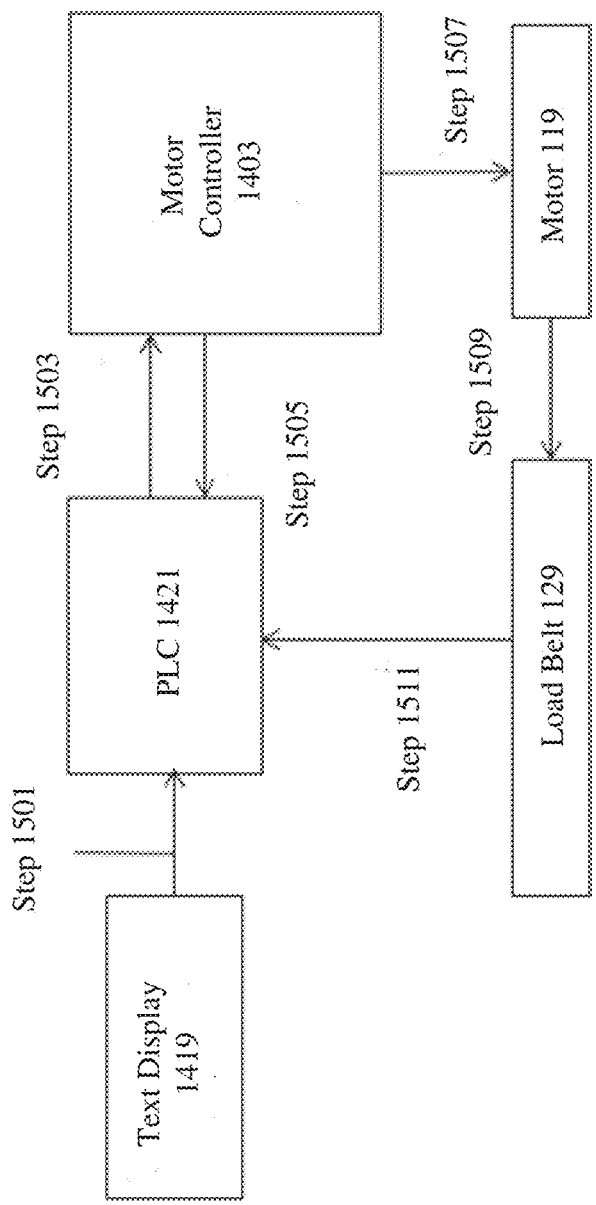
FIG. 15 is a diagram of signal communication among the electronic control system of FIG. 14.

Motor controller 1403 provides real-time operation statuses of motor 119 to PLC 1421 through a process 1505, as shown in FIG. 15. Motor controller 1403 controls start, stop, rotation speed and rotation direction of motor 119.

Transformer switch 1405 provides power for transformer 1407. Transformer 1407 provides power for PLC 1421.

Power switch 1411 and normal open relay switch 1413 provide power for power-off brake 307.

Normal open relay switch 1413 is open as a default position. PLC 1421 controls an on or off state of power-off brake 307 through normal open relay switch 1413. Specifically, when PLC 1421 indicates an on state for power-off brake 307, normal open relay switch 1413 is closed and power-off brake 307 has power to turn brake 1417 off. When PLC 1421 indicates an off state for power-off brake 307, normal open relay switch 1413 is open, power-off brake 307 has no power and brake 1417 is on.

Relay coil for brake control 1409 is controlled by PLC 1421. Relay coil for brake control 1409 controls the status of normal open relay switch 1413. When relay coil for brake control 1409 has power, it can create a magnetic field. The magnetic field creates an electromagnetic attraction force to open or close relay switch 1413. Specifically, when relay coil for brake control 1409 has power, normal open relay switch 1413 is closed. When normal open relay switch 1413 has power and is closed, power-off brake 307 has power, and brake 1417 of the power-off brake 307 is off. When brake 1417 is off, motor 119 operates. When no power is provided to relay coil for brake control 1409, normal open relay switch 1413 is open, and motor 119 cannot operate.

PLC 1421 controls motor controller 1403 to operate motor 119. Motor controller 1403 outputs status of motor 119 to PLC 1421. PLC 1421 further commands an on/off state for power-off brake 307, operation of upwards, downwards, start, stop, stroke adjustment, stroke frequency adjustment, brake stop and any other functions of apparatus 100 through a process 1503. PLC 1421 is the controller for apparatus 100. PLC 1421 receives operation instructions of motor 119 from text display 1419 as inputs.

Upwards start button 1423 controls operation of motor 119 to move connector 131 up. Specifically, when upwards start button 1423 is pressed, PLC 1421 provides output signals to command power-off brake 307 to turn off brake 1417 and provides a command to operate motor 119 in a clockwise direction.

Downwards start button 1425 controls the operation of motor 119 to move connector 131 downward. Specifically, when downwards start button 1423 is pressed, PLC 1421 provides output signals to command power-off brake 307 to turn off brake 1417, and a command to operate motor 119 in an anticlockwise direction.

Stop button 1427 stops operation of motor 119. Operator 1429 can press stop button 1427 to command PLC 1421 to have a shutdown action. More specifically, when operator 1429 presses stop button 1427, it provides an input signal to PLC 1421. PLC 1421 provides output signals to command power-off brake 307 to turn off brake 1417. At the same time, motor controller 1403 controls motor 119 to stop the movement of connector 131. PLC 1421 can extract and save a last stop position of load belt 129 to determine an initial desired direction of travel.

Encoder 309 counts the rotation number of motor 119. Specifically, encoder 309 records the number of rotations indicated by detecting movement of motor 119.

Reference position switch 305 receives a signal through induction and sends out pulse signals to PLC 1421 when reference soft iron 301 reaches the location of reference position switch 305. PLC 1421 records zero reference position 304 when reference soft iron 301 reaches the location of reference position switch 305.

Manual/automatic switch 1433 changes the operation of apparatus 100 to be manual or automatic.

Text display 1419 can set the operation parameters of apparatus 100. Operation parameters of motor 119, such as stroke and frequency, are provided or adjusted by text display 1419. Text display 1419 provides operation parameters of motor 119 as input signals to PLC 1421. For example, text display 1419 can adjust the maximum and the minimum strokes, operation speed and operation frequency of motor 119 when manual/automatic switch 1433 is set to be automatic.

Referring to FIG. 15, during process 1501, text display 1419 can provide input signals to PLC 1421 on the operation parameters of apparatus 100.

During process 1503, PCL 1421 commands motor controller 1403 to control start-stop, rotation speeds and rotation directions of motor 119.

During step 1505, motor controller 1403 can provide input signals to PLC 1421 to show the status of motor 119 on whether motor 119 is overloaded, the current of motor 119 is too high, or the voltage of motor 119 is too high or too low, and the like.

During step 1507, motor controller 1403 controls the start, stop and operation of motor 119.

During step 1509, motor 119 provides power to drive the movement of load belt 129 indirectly.

During step 1511, reference position switch 305 and encoder 309 send location signals of load belts 121 and motor 119 to PLC 1421 so that PLC 1421 can control the operation of motor 119.

The below describes the operation of apparatus 100 to have a complete cycle of movement. To illustrate, the complete cycle is divided into four steps: (1) connector 131 moves up, and load belt 129 on balance box 143 side reaches a reference position; (2) connector 131 moves up, and load belt 129 on balance box 143 side reaches a negative pre-determined stroke; (3) connector 131 moves down, and load belt 129 on balance box 143 side moves back to zero reference position 304; and (4) connector 131 moves down, load belt 129 on balance box 143 side reaches a positive pre-determined stroke.

During step (1), connector 131 is located in the wellhead of an oil well. Power switch 1401 is closed to supply power to electronic control cabinet 153. Operator 1429 presses upwards start button 1423, PLC 1421 has an input signal to move connector 131 up. After a logical analysis, PLC 1421 provides power to relay coil for brake control 1409. When relay coil for brake control 1409 has power, normal open relay switch 1413 is closed, and provides power to power-off brake 307. Brake 1417 of power-off brake 307 is off. Power-off brake 307 is in a non-braking status. PLC 1421 and motor controller 1403 send signals to provide power to motor 119 so that motor 119 can operate in an anticlockwise direction. Specifically, load roller wheel 124 drives load roller 125 rotate in an anticlockwise direction so that a portion of load belt 129 that wraps or coils around load roller 125 moves down on balance box 143 side.

Load belt 129 covers load roller 125, as shown in FIG. 1. Load from device 132 and tension of load belt 129 from driven belt 121 around load roller 125 cause a large friction force between load belt 129 and load roller 125. The friction force drives load roller 125 to rotate in an anticlockwise direction when load roller wheel 124 rotates load roller 125 in an anticlockwise direction.

When load roller 125 rotates, load belt 129 on balance box side of load roller 125 moves down, and reference soft iron 301 reaches the closest position to reference position switch 305. Reference position switch 305 sends a pulse signal to PLC 1421 of electric control cabinet 153. PLC 1421 then records this position as zero reference position 304.

During step (2), load roller 125 and motor 119 continues to rotate. After zero reference position 304, when motor 119 rotates one additional cycle, encoder 309 starts to add one to the total number of rotation recorded by encoder 309 and sends a pulse signal to PLC 1421. PLC 1421 records the number of pulse signals and calculates the displacement conversion of load belt 129. When reference soft iron 301 is located below zero reference position 304, the number of pulse signals sent by encoder 309 is negative, and when reference soft iron 301 is located above zero reference position 304, the number of pulse signals sent by encoder 309 is positive.

When the moving distance of load belt 129 reaches a pre-determined threshold of stroke set by text display 1419, PLC 1421 sends a commutation signal to motor controller 1403. Motor controller 1403 outputs reversing power inputs to motor 119. As a result, motor 119 rotates reversely. More specifically, motor 119 rotates in a clockwise direction.

During step (3), when motor 119 rotates in a clockwise direction, load roller 125 rotates in the clockwise direction. When load roller 125 rotates, load belt 129 on balance box 143 side of load roller 125 moves up, and reference soft iron 301 reaches the closest position to reference position switch 305. Reference position switch 305 sends a pulse signal to PLC 1421 of electric control cabinet 153. PLC 1421 then records the closest position as reference position 304.

During step (4), as motor 119 continues to rotate in the clockwise direction, device 132 moves down. The movement of load belt 129 connected to connector 131 is tracked by encoder 309. Every time when motor 119 rotates one circle and the rotation is recorded by encoder 309, the number of rotation adds "1". Simultaneously, encoder 309 sends a pulse signal to PLC 1421. PLC 1421 records the number of pulse signals and calculates the moving distance of load belt 129.

When the moving distance reaches an upper pre-determined threshold of stroke set by text display 1419, PLC 1421 sends a signal to motor controller 1403. Motor controller 1403 sends reverse input currents to motor 119. As a result, motor 119 rotates reversely. Specifically, motor 119 rotates in an anticlockwise direction to pull connector 131 and device 132 up.

Step (1) of the cycle movement will start again.

After connector 131 and device 132 moves from up to down and then from down to up, a cycle movement of apparatus 100 is complete.

Apparatus 100 can have as many cycles of steps (1)-(4) as necessary to pull crude coil to ground 155. Apparatus 100 can be stopped at any time in the middle of a cycle movement. Crude oil is contained in device 132 or any other devices that is connected to device 132. Any other devices can be in parallel or in serial connection with device 132 as long as apparatus 100 can handle the operation requirements such as load requirements.

PLC 1421 can control the direction of movement and stroke of device 132 instantaneously. PLC 1421 can also save the real-time operation status of motor 119. When apparatus 100 is in an automatic operation mode, apparatus 100 can be restarted from a status when apparatus 100 is stopped.

Because reference soft iron 301 is installed inside load belt 129 and does not shift, a zero calibration when the reference soft iron passes reference switch 305 can maintain an accuracy of tracking the stroke of load belt 129.

When operator 1429 presses stop button 1427 during any cycle movements, electric control cabinet 153 can save the status of apparatus 100 automatically, and PLC 1421 will not supply power to motor 119 and power-off brake 307. Brake 1419 of is on, and apparatus 100 is stopped.

The below description describes the details that apparatus 100 operates in a manual operation mode.

When apparatus 100 is in a manual operation mode, power switch 1401 and transformer switch 1405 are closed to supply power to electric control cabinet 153. Manual/automatic switch 1433 is switched to a manual operation mode.

Operator 1429 presses and holds upwards start button 1423. PLC 1421 provides power to relay coil for brake control 1409. When relay coil for brake control 1409 has power, normal open relay switch 1413 is closed and provides power to power-off brake 307. Brake 1417 of power-off brake 307 is off. Power-off brake 307 is in a non-braking status. PLC 1421 and motor controller 1403 send signals to provide power to motor 119 so that the motor can operate in an anticlockwise direction. Motor controller 1403 controls motor 119 to rotate in a speed specified by text display 1419. Load roller wheel 124 drives load roller 125 to rotate in an anticlockwise direction. Connector 131 and device 132 move up. When operator 1429 releases upwards start button 1423, PLC 1421 sends a signal to motor controller 1403 to stop motor 119, and normal open relay switch 1413 is open and provides no power to power-off brake 307. Brake 1417 of power-off brake 307 is on. Power-off brake 307 is in a braking status.

The manual upwards operation process when operator 1429 presses and holds upwards start button 1423 is similar to a process when operator 1429 presses and holds downward start button 1425. The difference is that when operator 1429 presses and holds downwards start button 1425, motor 119 starts to rotate in a clockwise direction because connector 131 moves down.

The below description descries that apparatus 100 operates in an automatic operation mode.

Manual/automatic switch 1433 is set to be an automatic mode. PLC 1421 scans whether there is any fault in the memory of PLC 1421. When there is a fault, PLC 1421 can display the fault. PLC 1421 will not start apparatus 100 unless all the faults are resolved. PLC 1421 can determine the location of connector 131 either from the operation status when apparatus 100 was stopped, or from signals of reference position switch 305 and signals of encoder 309. For example, if the number counted by encoder 309 is recorded as a positive number, it means that reference soft iron 301 is located above zero reference position 304. Zero reference position 304 is the position where reference soft iron 301 is in the closest position to reference position switch 305. Signals of encoder 309 can determine the location of load belt 129 relative to reference position switch 305.

Once the location of connector 131 is determined, PLC 1421 provides power to relay coil for brake control 1409. When relay coil for brake control 1409 has power, normal open relay switch 1413 is closed and provides power to power-off brake 307. Brake 1417 of power-off brake 307 is off, and the power-off brake is in a non-braking status. PLC 1421 and motor controller 1403 send signals to provide power to motor 119. Motor controller 1403 controls motor 119 to rotate in a speed specified by text display 1419. It is assumed that from the location of connector 131, motor 119 will operate in an anticlockwise direction so that reference soft iron 301 can move down. As motor 119 rotates, encoder 309 sends a signal to PLC 1421 when motor 119 rotates an additional cycle, PLC 1421 records the number of pulse signals and calculates the moving distance of load belt 129.

When the calculated displacement of load belt is close to the upper pre-determined threshold of stroke set by text display 1419, motor 119 starts to decelerate the rotation speed gradually. Once the displacement reaches the upper pre-determined threshold of stroke, PLC 1421 sends a signal to motor controller 1403. Motor controller 1403 changes the phases of input currents to motor 119. As a result, motor 119 rotates reversely, namely rotates in a clockwise direction.

When motor 119 rotates in the clockwise direction, reference soft iron 301 moves up. When reference soft iron 301 is in the closest position to reference position switch 305, a zero position is reset again. Encoder 309 sends a signal to PLC 1421 when motor 119 rotates one cycle recorded by encoder 309. PLC 1421 records the number of pulse signals and calculates the moving distance of load belt 129. After load belt 129 passes the zero reference position, and when the calculated displacement is close to the lower pre-determined threshold of stroke set by text display 1419, motor 119 starts to decelerate the rotation speed of motor 119 gradually. Once the displacement reaches the lower pre-determined threshold of stroke, PLC 1421 sends a signal to motor controller 1403 to change the phases of input currents to motor 119. As a result, motor 119 rotates reversely, namely rotates in an anticlockwise direction again.

When the recorded number of rotations by encoder 309 is negative, it means that reference soft iron 301 is located below zero reference position 304.

The operation parameters of motor 119 are set by text display 1419. The parameters include, but are not limited to, a frequency of motor 119, the rotation speed of the motor and the upper and the lower pre-determined thresholds of displacement.

In one embodiment, motor 119 can be a permanent magnetic synchronic motor with a large torque and the torque is not lower than 700 N.m. In one embodiment, the power of motor is not lower than 14 kilowatts.

In should be noted "anticlockwise" and "clockwise" are defined as if operator 1429 views FIG. 1 of apparatus 100 from a side view, as shown in FIG. 1.

Referring to FIG. 16, load roller wheel 124 includes a plurality of teeth 1601 to bite load belt 121, a plurality of ribs 1603 to strengthen load roller wheel 124, and a hub 1605 for connection.

In one embodiment, load roller wheel 124 has a tooth pitch 14 mm; the number of teeth is 200; the distance between two adjacent teeth is 14 mm; the pitch diameter is about 891.27 mm; and the addendum circle diameter is about 888.48 mm.

In another embodiment, load roller wheel 124 has a tooth pitch 14 mm; the number of teeth is 224; the distance between two adjacent teeth is 14 mm; the pitch diameter is about 998.22 mm; and the addendum circle diameter is about 995.43 mm.

In another embodiment, load roller wheel 124 has a tooth pitch 14 mm; the number of teeth is 252; the distance between two adjacent teeth is 14 mm; the pitch diameter is about 1123 mm; and the addendum circle diameter is about 1120.2 mm.

Figure 17:
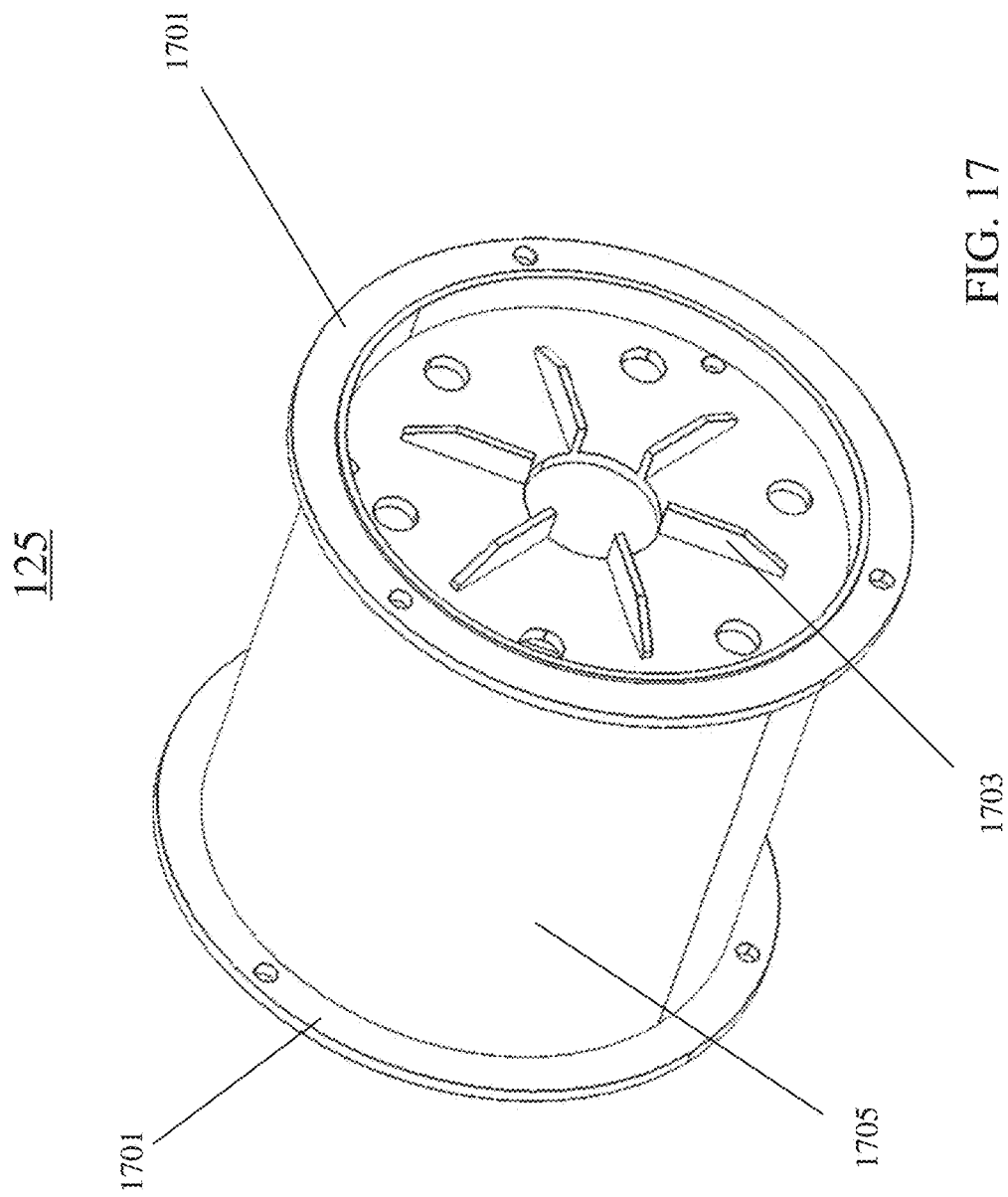
FIG. 17 shows an exemplary load roller of the oil pumping apparatus of FIG. 1.

FIG. 17 shows load roller 125 of the oil pumping apparatus of FIG. 1. As shown in FIG. 17, load roller 125 includes two roller shoulders 1701 to keep load belt 119 from leaving load roller 125, a plurality of ribs 1703 to improve the strength of load roller 125, and a roller body 1705.

Figure 18:
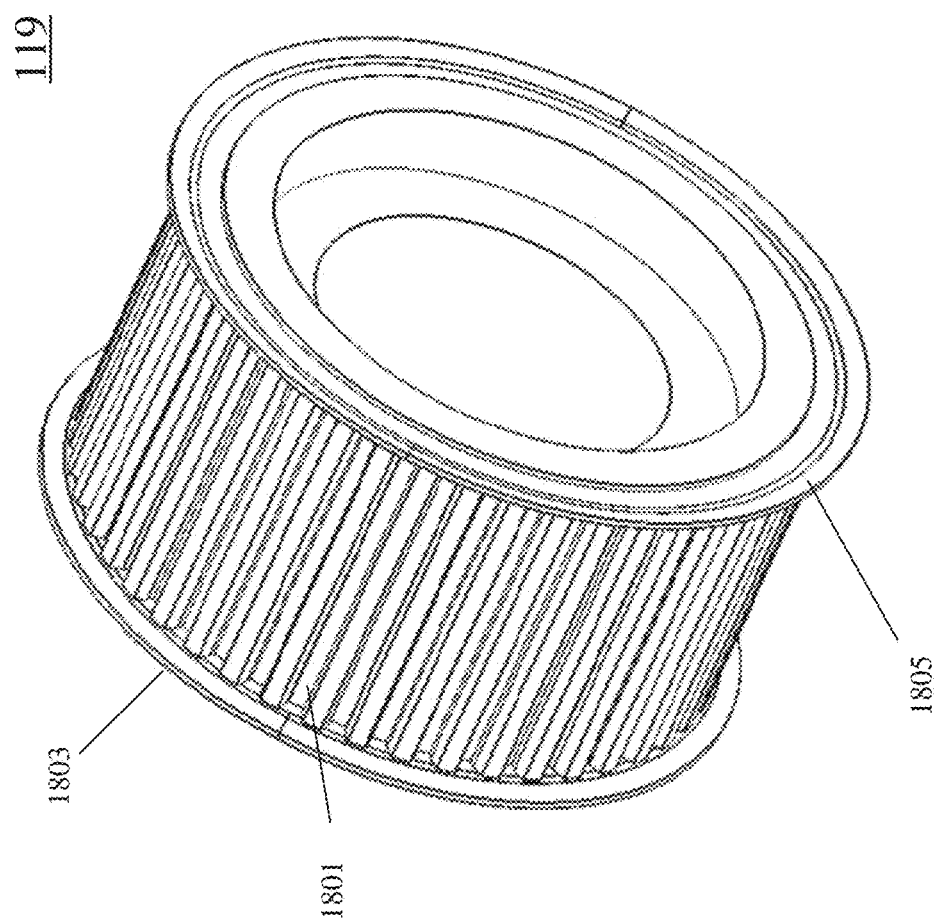
FIG. 18 shows an exemplary electrical motor wheel of the oil pumping apparatus of FIG. 1.

FIG. 18 shows an exemplary electrical motor wheel of the oil pumping apparatus of FIG. 1. In FIG. 18, motor wheel 122 includes a plurality of teeth 1801, a plurality of teeth 1803, and two electrical motor wheel shoulders 1805.

In one embodiment of electrical motor wheel 122, motor wheel 122 has a tooth pitch about 14 mm. The number of teeth is 40; the pitch diameter is about 178.25 mm and the addendum circle diameter is about 175.46 mm.

In another embodiment of electrical motor wheel 122, motor wheel 122 has a tooth pitch 14 mm; the number of teeth is 45; the distance between two adjacent teeth is 14 mm; the pitch diameter is about 200.54 mm and the addendum circle diameter is about 197.74 mm.

Referring to FIGS. 1-4 and 11, in one embodiment, the parameters for electrical motor wheel 122, load roller 125 and driven belt 121 in the following Table 1.

TABLE 1

Exemplary parameters of the electrical motor wheel, load roller and the driven belt of the oil pumping apparatus.

| Tooth profile | PROF = | C14M | |
|---|---|---|---|
| Tooth pitch | T = | 14.00 | mm |
| Number of teeth on small pulley | ZK = | 40 | |
| Pitch diameter of small pulley | DWK = | 178.25 | mm |
| Number of teeth on large pulley | ZG = | 200 | |
| Pitch diameter of large pulley | DWG = | 891.27 | mm |
| Speed of small pulley | NK = | 191.00 | rpm |
| Speed of large pulley | NG = | 38.20 | rpm |
| Transmisssion ratio | I = | 5.00 | |
| Belt length | LW = | 3500.00 | mm |
| Number of teeth timing belt | Z = | 250.00 | |
| Centre distance | AER = | 832.42 | mm |
| Arc of contact on the small pulley | BETA = | 129.28 | grd |
| Number of teeth in mesh on small pulley | ZE = | 14.36 | |
| Belt speed | V = | 1.78 | m/s |
| Belt flex frequency | BF = | 1.02 | Hz |
| Overall service factor | C0 = | 2.20 | |
| Teeth in mesh factor | C1 = | 1.00 | |
| Length factor | C5 = | 1.15 | |
| Power to be transmitted | P = | 14.00 | kW |
| Torque on small pulley | MDK = | 699.95 | Nm |
| Torque on large pulley | MDG = | 3499.74 | Nm |
| Calculated belt width | BERR = | 38.82 | mm |
| Chosen belt width | B = | 37.00 | mm |
| Power rating for belt width | PR = | 28.35 | kW |
| Calculated overall service factor | C0ER = | 2.10 | |
| Effective pull | FU = | 7853.40 | N |
| Static belt tension | FSTAT = | 4746.36 | N |
| Total axle load | FV = | 8578.07 | N |
| Belt tension load factor | k1 = | 1.00 | |
| Belt tension service factor | k2 = | 1.21 | |
| Natural frequency of belt span | EIF = | 85 | Hz |

In another embodiment, the parameters for electrical motor wheel 122, load roller 125 and driven belt 121 in the following Table 2.

In both Tables 1 and 2, small pulley refers to electrical motor wheel 122, large pulley refers to load roller 125 and the belt refers to driven belt 121.

TABLE 2

Exemplary parameters of the electrical motor wheel, load roller and the driven belt of the oil pumping apparatus.

| Tooth profile | PROF = | C14M | |
|---|---|---|---|
| Tooth pitch | T = | 14.00 | mm |
| Number of teeth on small pulley | ZK = | 45 | |
| Pitch diameter of small pulley | DWK = | 200.54 | mm |
| Number of teeth on large pulley | ZG = | 252 | |
| Pitch diameter of large pulley | DWG = | 1123.00 | mm |
| Speed of small pulley | NK = | 199.00 | rpm |
| Speed of large pulley | NG = | 35.54 | rpm |
| Transmisssion ratio | I = | 5.60 | |
| Belt length | LW = | 4326.00 | mm |
| Number of teeth on timing belt | Z = | 309.00 | |
| Centre distance | AER = | 1017.00 | mm |
| Arc of contact on the small pulley | BETA = | 126.06 | grd |
| Number of teeth in mesh on small pulley | ZE = | 15.76 | |
| Belt speed | V = | 2.09 | m/s |
| Belt flex frequency | BF = | 0.97 | Hz |
| Overall service factor | C0 = | 2.20 | |
| Teeth in mesh factor | C1 = | 1.00 | |
| Length factor | C5 = | 1.23 | |
| Power to be transmitted | P = | 52.10 | kW |
| Torque on small pulley | MDK = | 2500.00 | Nm |
| Torque on large pulley | MDG = | 14000.00 | Nm |
| Calculated belt width | BERR = | 124.69 | mm |
| Chosen belt width | B = | 135.00 | mm |
| Power rating for belt width | PR = | 124.91 | kW |
| Calculated overall service factor | C0ER = | 2.40 | |
| Effective pull | FU = | 24933.28 | N |
| Static belt tension | FSTAT = | 15528.13 | N |
| Total axle load | FV = | 27678.75 | N |
| Belt tension load factor | k1 = | 1.00 | |
| Belt tension service factor | k2 = | 1.25 | |
| Natural frequency of belt span | EIF = | 70 | Hz |

In one embodiment, driven belt 121 can be synchronous timing belt that features premium material usage and construction ensuring reliable mechanical power transmission for high torques and for high dynamic stressing. Driven belt 121 may permit reverse flexing in multi timing belt pulley drives and is the optimum alternative to chain drives. The tooth profile of driven belt 121 ensures faultless meshing and hence smooth running at high speeds. At the same time it prevents tooth ratcheting at high torques.

Driven belt 121 is developed for punishing heavy duty applications where large power outputs, high torques and high speeds have to be reliably transmitted, and excels in applications with high dynamic stressing. Driven belt 121 may have four layers in sequence, namely polyurethane teeth, specially treated fabric, carbon tension member, and polyurethane backing. Polyurethane teeth is the layer that can be in contact with motor wheel 122 and load roller 125.

Figure 19:
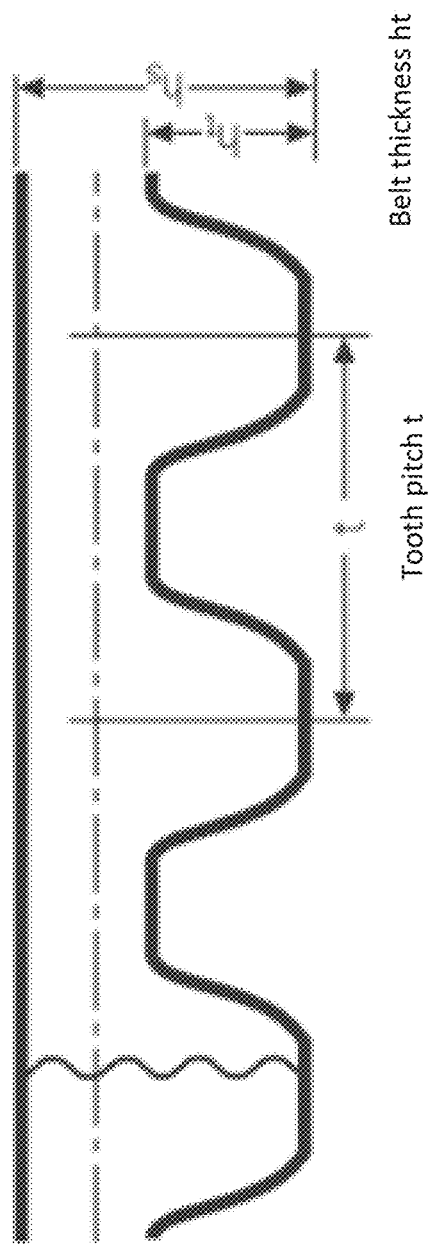
FIG. 19 is an exemplary embodiment of the driven belt of the oil pumping apparatus of FIG. 1.

FIG. 19 shows the sectional view of driven belt 121. The tooth pitch (t) can be about 8 mm and about 12 mm, and the tooth height (hs) is about 3.6 mm and about 4.1 mm corresponding to 8 mm and 12 mm tooth pitch, respectively. The belt thickness (ht) is about 5.6 mm and about 10 mm corresponding to 8 mm and 12 mm tooth pitch, respectively.

Table 3 and table 4 shows the exemplary allowable working tension for driven belt 121.

TABLE 3

Exemplary allowable working tension for dynamic applications.

| 8M | | 14M | |
|---|---|---|---|
| Width [mm] | Force [lbs] | Width [mm] | Force [lbs] |
| 12 | 528 | 37 | 2191 |
| 21 | 932 | 68 | 4069 |
| 36 | 1607 | 90 | 5507 |
| 62 | 2776 | 125 | 7553 |

TABLE 4

Exemplary allowable working tension for quasi-static applications where rotation speed n <100 rpm

| 8M | | 14M | |
|---|---|---|---|
| Width [mm] | Force [lbs] | Width [mm] | Force [lbs] |
| 12 | 696 | 37 | 2967 |
| 21 | 1225 | 68 | 4934 |
| 36 | 2101 | 90 | 7137 |
| 62 | 3619 | 125 | 9891 |

In Table 4, a quasi-static application is defined as one where the drive speed is less than 100 rpm. In Tables 3 and 4, the width refers to the width of driven belt 121.

Table 5 presents the operating parameters of motor 119.

TABLE 5

Operating parameter of the motor.

| Motor No. | 1 | 2 | 3 | 4 | 5 |
|---|---|---|---|---|---|
| Toque (N.m) | 700 N.m | 1050 N.m | 1500 N.m | 2500 N.m | 2500 N.m |
| Rotation speed (r/min) | 191 | 199 | 199 | 199 | 250 |
| Power (kilowatts) | 14 | 21.9 | 31.3 | 52.1 | 65.4 |

In Table 5, there are five exemplary motors used in the present disclosure. In one embodiment, motor 119 has a torque about 700 N.m, a rotation speed about 191 revolutions per minute, and the power of about 14 kilowatts.

In one embodiment, motor 119 has a torque about 1050 N.m, a rotation speed about 199 revolutions per minute, and the power of about 21.9 kilowatts.

In one embodiment, motor 119 has a torque about 1500 N.m, a rotation speed about 199 revolutions per minute, and the power of about 31.3 kilowatts.

In one embodiment, motor 119 has a torque about 2500 N.m, a rotation speed about 199 revolutions per minute, and the power of about 52.1 kilowatts.

In another embodiment, motor 119 has a torque about 2500 N.m, a rotation speed about 250 revolutions per minute, and the power of about 65.4 kilowatts. The torque of motor 119 is dependent on the load of device 132. When device 132 is heavy, motor 119 will have a large torque.

It should be noted that "negative" and "positive" are relative terms with respect to zero reference position 304.

It should also be noted that the terms "first", "second", and the like can be used herein to modify various elements. These modifiers do not imply a spatial, sequential or hierarchical order to the modified elements unless specifically stated.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments are chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An oil pumping apparatus comprising:
a connector connected to a device;
a top platform supported on a frame for operation and maintenance of the oil pumping apparatus;
a roller disposed on the top platform and having a first axle, the roller being rotatable about the first axle and being connected to a first wheel coaxially, wherein the first wheel has a first diameter;
a motor disposed on the top platform and having a second axle, the motor being rotatable about the second axle and having a second wheel, wherein the second wheel has a second diameter, and the first diameter of the first wheel is at least five times of the second diameter of the second wheel;
a driven belt covering the first wheel and the second wheel and being a heavy-duty timing belt to enable synchronous drives to operate the roller, wherein the roller is driven by the motor through the driven belt and the first wheel;
a load belt moveable over the roller, one end of the load belt having one end connected to the connector, and the other end of the load belting being connected to a balance box to balance the weight of the device; and
a control system for the apparatus,
wherein when the motor rotates in a clockwise direction, the motor drives the roller rotate in the clockwise direction through the driven belt and the device moves down vertically; and
wherein when the motor rotates in an anticlockwise direction, the motor drives the roller rotate in the anticlockwise direction and the device moves up vertically.

2. The oil pumping apparatus of claim 1, where the motor is one selected from the group consisting of an asynchronous motor, a direct current motor, a switched reluctance motor, and a permanent magnet synchronous motor.

3. The oil pumping apparatus of claim 1, where the motor has a torque capacity not lower than 700 N.m and a power not lower than 14 kilowatts.

4. The oil pumping apparatus of claim 1, wherein the driven belt comprises a hybrid tension member made of a glass carbon compound that enables drive solutions and is usable in drives subject to heavy-duty tensile loads, acceleration forces and shock loads.

5. The oil pumping apparatus of claim 1, further comprising an intermediate shaft disposed between the motor and the roller, wherein the immediate shaft has a first end connected to a third wheel and a second end connected to a fourth wheel, the third wheel is connected to the second wheel through a second driven belt and the fourth wheel is connected to the first wheel through a third driven belt, the second wheel of the motor drives the third wheel through the second driven belt and the fourth wheel through the immediate shaft simultaneously, and the fourth wheel drives the first wheel through the third driven belt.

6. The oil pumping apparatus of claim 5, wherein the third wheel has a third diameter and the fourth wheel has a fourth diameter, and each of the third diameter and the fourth diameter is larger than the second diameter and smaller than the first diameter.

7. The oil pumping apparatus of claim 1, wherein the load belt and balance box are moveable vertically.

8. The oil pumping apparatus of claim 1, further comprising an unloading mechanism, wherein
the uploading mechanism comprises an unloading wire rope;
one end of the unloading wire rope is fixed with the roller; and
the other end of the unloading wire rope goes through two movable pulleys of the balance box and connects to the top platform, and wherein to unload the device from the connector, the roller collects the uploading wire rope to pull up the balance box vertically.

9. The oil pumping apparatus of claim 8, further comprising a loss-of-load protection mechanism comprising:
a speed limiter mounted on the top platform;
a fixed pulley mounted on the bottom of the frame;
a loss-of-load protection wire rope bypassing both the speed limiter and the fixed pulley;
a connecting rod assembly mounted on the top of the balance box;
two guide rails welded to the frame; and
two clamp assemblies each installed on one side of the balance box and each having wedge clamping pieces distributed on sides of the two guide rails,
wherein one end of the loss-of-load protection wire rope is connected to the connecting rod assembly and the other end of the loss-of-load protection wire rope is connected to the balance box; and
wherein when the weight of the device is disconnected from the oil pumping apparatus, the speed limiter holds the loss-of-load protection wire rope, and the loss-of-load protection wire rope grabs the connecting rod assembly to trigger that the wedge clamping pieces clamp one of the two guide rails and two clamp assemblies clamp the guide rails to prevent the balance box from falling.

10. The oil pumping apparatus of claim 9, further comprising guide wheels, wherein the two guide rails guide the movement of the balance box vertically through the guide wheels and each of the two guide rails is disposed between two guide wheels of the guide wheels.

11. The oil pumping apparatus of claim 1, further comprising:
an encoder mounted on the motor,
wherein the encoder sends a signal to a programmable logic controller to record the rotation of the motor.

12. The oil pumping apparatus of claim 1, further comprising
a reference soft iron and a reference position switch, the reference soft iron being installed inside the load belt,
wherein when the reference soft iron is in a closest position to the reference position switch, the reference position switch sets the closest position as a reference position and sends a signal to a programmable logic controller.

13. The oil pumping apparatus of claim 1, further comprising an automatic mode and a manual operation mode.

14. The oil pumping apparatus of claim 1, the control system further comprises:
a programmable logic controller (PLC);
a motor controller connected to both the PLC and the motor; and
a text display directly connected to the PLC providing a frequency of the motor, a rotation speed of the motor, and an upper and a lower thresholds of movement distances of the load belt to the PLC.

15. The oil pumping apparatus of claim 14, wherein the PLC controls the motor controller and provides power to a relay coil for brake and a normal open relay switch.

16. The oil pumping apparatus of claim 15, wherein the control system further comprises a power-off brake,
wherein the relay coil for brake and the normal open relay switch control the operation of the power-off brake, and
wherein the power-off brake can set the oil pumping apparatus to have either a braking or a non-braking status.

17. The oil pumping apparatus of claim 14, wherein the motor controller controls start, stop, rotation speeds, and rotation directions of the motor, and provides real-time status of the motor to the PLC.

18. The oil pumping apparatus of claim 17, wherein the motor controller determines the statuses of the motor on whether the motor is overloaded or has overcurrent and/or overvoltage.

19. The oil pumping apparatus of claim 17, wherein the friction coefficient between the load roller and the load belt is above 0.6 and the friction force between the load roller and the load belt is greater than load difference between the device and the balance box so that there is no slip between the load roller and the load belt.

20. The oil pumping apparatus of claim 14, further comprising,
a display panel, the display panel including an upwards start button, a downwards start button, and a stop button,
wherein the upwards start button moves the connector up, the downwards start button moves the connector down, and the stop button stops the oil pumping apparatus.

* * * * *